US012621493B2

(12) United States Patent
Wang et al.

(10) Patent No.: US 12,621,493 B2
(45) Date of Patent: *May 5, 2026

(54) VIDEO CODING USING PARAMETER SETS

(71) Applicant: Bytedance Inc., Los Angeles, CA (US)

(72) Inventors: Ye-kui Wang, San Diego, CA (US); Li Zhang, San Diego, CA (US); Kai Zhang, San Diego, CA (US)

(73) Assignee: Bytedance Inc., Los Angeles, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 18/503,900

(22) Filed: Nov. 7, 2023

(65) Prior Publication Data

US 2024/0089503 A1 Mar. 14, 2024

Related U.S. Application Data

(63) Continuation of application No. 17/957,139, filed on Sep. 30, 2022, now Pat. No. 11,812,063, which is a
(Continued)

(51) Int. Cl.
*H04N 19/70* (2014.01)
*H04N 19/169* (2014.01)
(Continued)

(52) U.S. Cl.
CPC ........... *H04N 19/70* (2014.11); *H04N 19/172* (2014.11); *H04N 19/174* (2014.11); *H04N 19/188* (2014.11)

(58) Field of Classification Search
CPC ..................................................... H04N 19/70
(Continued)

(56) References Cited

U.S. PATENT DOCUMENTS

| 2005/0180512 A1 | 8/2005 | Narasimhan |
| 2014/0355692 A1* | 12/2014 | Ramasubramonian ...................... H04N 19/597 375/240.26 |

(Continued)

FOREIGN PATENT DOCUMENTS

| CN | 103024389 A | 4/2013 |
| CN | 104079975 A | 10/2014 |

(Continued)

OTHER PUBLICATIONS

"Series H: Audiovisual and Multimedia Systems Infrastructure of Audiovisual Services—Coding of Moving Video," Telecommunication Standardization Sector of ITU, Infrastructure of Audiovisual Services—Coding of Moving Video, High Efficiency Video Coding, ITU-T H.265, CH, Nov. 2019, 712 Pages.

(Continued)

*Primary Examiner* — Yulin Sun
(74) *Attorney, Agent, or Firm* — Conley Rose, P.C.

(57) ABSTRACT

Methods and apparatus for video processing are described. The processing may include video encoding, video decoding or video transcoding. An example video processing method includes performing a conversion between a video comprising one or more pictures and a bitstream of the video according to a format rule, and wherein the format rule specifies that, in response to satisfying one or more conditions, a syntax element indicating whether a first syntax structure providing a profile, a tier and a level information and a second syntax structure providing decoded picture buffer information are present in a sequence parameter set is set to be equal to 1 to indicate that the first syntax structure and the second syntax structure are present in the sequence parameter set.

16 Claims, 16 Drawing Sheets

Related U.S. Application Data continuation of application No. PCT/US2021/025351, filed on Apr. 1, 2021.

(60) Provisional application No. 63/006,054, filed on Apr. 6, 2020.

(51) Int. Cl.
H04N 19/172 (2014.01)
H04N 19/174 (2014.01)

(58) Field of Classification Search
USPC .................................................... 375/240.01
See application file for complete search history.

(56) References Cited

U.S. PATENT DOCUMENTS

| | | | | |
|---|---|---|---|---|
| 2016/0212437 A1* | 7/2016 | Tsukuba | ................. | H04N 19/44 |
| 2016/0255359 A1 | 9/2016 | Yu | | |
| 2017/0134742 A1* | 5/2017 | Deshpande | .......... | H04N 19/184 |
| 2018/0277164 A1 | 9/2018 | Wang | | |
| 2018/0295382 A1* | 10/2018 | Liu | ...................... | H04N 19/593 |
| 2019/0068964 A1 | 2/2019 | Kadono | | |
| 2020/0053392 A1 | 2/2020 | Hannuksela | | |
| 2021/0297655 A1 | 9/2021 | He | | |
| 2022/0094909 A1* | 3/2022 | Hannuksela | ......... | H04N 19/167 |
| 2022/0132148 A1 | 4/2022 | Wang | | |

FOREIGN PATENT DOCUMENTS

| | | |
|---|---|---|
| CN | 110431849 A | 11/2019 |
| JP | 7529794 B2 | 8/2024 |
| WO | 2020053805 A1 | 3/2020 |

OTHER PUBLICATIONS

Extended European Search Report for European Application No. 21788895.7, mailed Apr. 13, 2023, 8 Pages.

Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.

Document: JVET-R0052-v1, Hsiang, S., et al., "AHG9: Overhead reduction for picture header and slice header," Joint Video Experts Team (JVET) of ITU-T SG 16 WP 3 and ISO/IEC JTC 1/SC 29/WG 11 18th Meeting: by teleconference, Apr. 15-24, 2020, 13 pages.

Document: JVET-R0151-v3, Sauer, J., et al. "AHG6/AHG12: Uncoded subpictures and potential applications," Joint Video Experts Team (JVET) of ITU-T SG 16 WP 3 and ISO/IEC JTC 1/SC 29/WG 11 18th Meeting: by teleconference, Apr. 15-24, 2020, 12 pages.

"Information technology—High efficiency coding and media delivery in heterogeneous environments—Part 2: High Efficiency Video Coding," ISO/IEC JTC 1/SC 29/WG 11 N 17661, Text of DIS ISO/IEC 23008-2:201x (4th ed.), Apr. 20, 2018, 8 pages.

Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

Bossen, F., Retrieved from the internet: https://vcgit.hhi.fraunhofer.de/jvet/VVCSoftware_VTM.git, VTM software, Oct. 18, 2022, 3 pages.

Document: JVET-R0267, Coban, M., et al., "AHG9/AHG12: On mixed NAL unit types," Joint Video Experts Team (JVET) of ITU-T SG 16 WP 3 and ISO/IEC JTC 1/SC 29/WG 11 18th Meeting: by teleconference, Apr. 15-24, 2020, 7 pages.

Document: JVET-R0191-r1, Hendry, "AHG9: On miscellaneous updates for HLS signalling," Joint Video Experts Team (JVET) of ITU-T SG 16 WP 3 and ISO/IEC JTC 1/SC 29/WG 11 18th Meeting: by teleconference, Apr. 15-24, 2020, 5 pages.

Document: JVET-R0042-v1, Wang, Y-K., "AHG8/AHG9/AHG12: On mixed subpicture types within a picture," Joint Video Experts Team (JVET) of ITU-T SG 16 WP 3 and ISO/IEC JTC 1/SC 29/WG 11 18th Meeting: by teleconference, Apr. 15-24, 2020, 10 pages.

Document: JVET-R0065-v1, Wang, Y-K., "AHG8/AHG9: On IRAP and GDR AUs," Joint Video Experts Team (JVET) of ITU-T SG 16 WP 3 and ISO/IEC JTC 1/SC 29/WG 11 18th Meeting: by teleconference, Apr. 15-24, 2020, 3 pages.

Document: JVET-R0063-v1, Zhang, L., et al., "AHG9: Signalling of LMCS control," Joint Video Experts Team (JVET) of ITU-T SG 16 WP 3 and ISO/IEC JTC 1/SC 29/WG 11 18th Meeting: by teleconference, Apr. 15-24, 2020, 4 pages.

Document: JVET-R0064-v1, Wang, Y-K., et al., "AHG9: Signalling of scaling list control," Joint Video Experts Team (JVET) of ITU-T SG 16 WP 3 and ISO/IEC JTC 1/SC 29/WG 11 18th Meeting: by teleconference, Apr. 15-24, 2020, 4 pages.

Schierl, T., et al., "System Layer Integration of High Efficiency Video Coding," IEEE Transactions on Circuits and Systems for Video Technology, vol. 22, No. 12, Dec. 2012, 14 pages.

Non-Final Office Action dated Mar. 30, 2023, 14 pages, U.S. Appl. No. 17/964,396, filed Oct. 12, 2022.

Communication From A Related Counterpart Application, PCT Application No. POCT/US2021/025351, International Search Report dated Aug. 17, 2021, 17 pages.

Communication From A Related Counterpart Application, PCT Application No. POCT/US2021/026534, International Search Report dated Sep. 10, 2021, 33 pages.

Non-Final Office Action dated Feb. 17, 2023, 15 pages, U.S. Appl. No. 17/957,139, filed Sep. 30, 2022.

Notice of Allowance dated Jul. 10, 2023, 5 pages, U.S. Appl. No. 17/957,139, filed Sep. 30, 2022.

Chinese Notice of Allowance from Chinese Patent Application No. 202180028190.6 dated Mar. 20, 2025, 8 pages.

Chinese Notice of Allowance from Chinese Patent Application No. 202180026286.9 dated Apr. 9, 2025, 8 pages.

Non-Final Office Action from U.S. Appl. No. 18/528,258 dated Apr. 10, 2025, 18 pages.

* cited by examiner

3600

Video processing Circuitry

3606

3602

Processor

3604

Memory

3000

3002 performing a conversion between a video comprising one or more layers comprising one or more video regions and a coded representation of the video according to a format rule

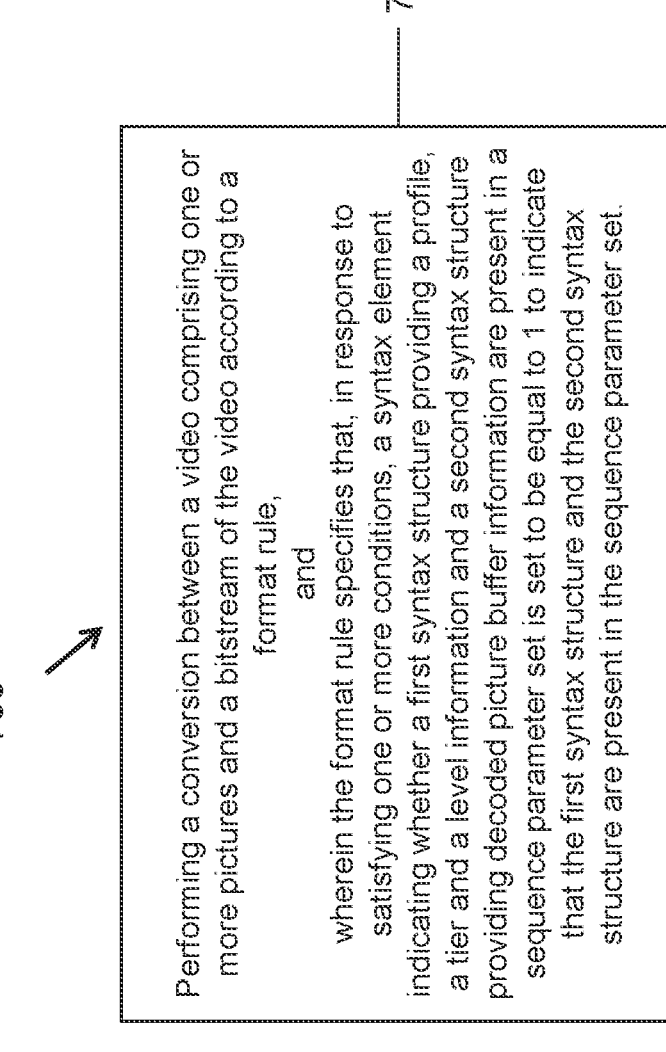

700

702

Performing a conversion between a video comprising one or more pictures and a bitstream of the video according to a format rule, and wherein the format rule specifies that, in response to satisfying one or more conditions, a syntax element indicating whether a first syntax structure providing a profile, a tier and a level information and a second syntax structure providing decoded picture buffer information are present in a sequence parameter set is set to be equal to 1 to indicate that the first syntax structure and the second syntax structure are present in the sequence parameter set.

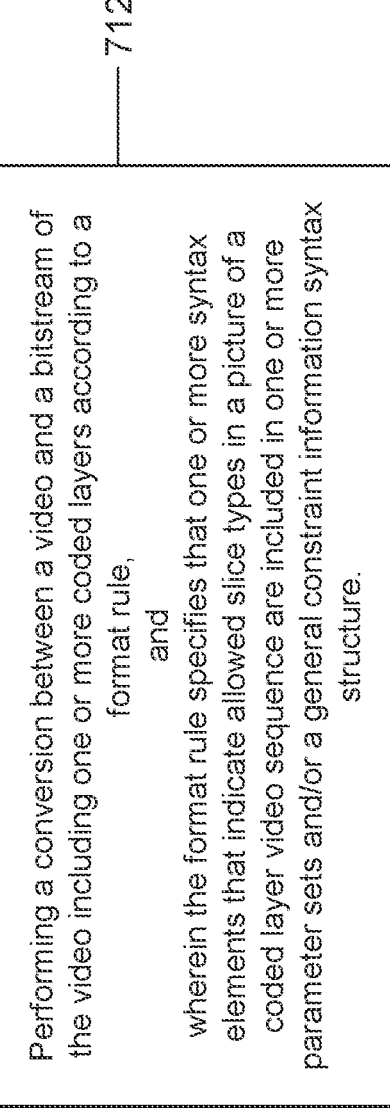

712

Performing a conversion between a video and a bitstream of the video including one or more coded layers according to a format rule, and wherein the format rule specifies that one or more syntax elements that indicate allowed slice types in a picture of a coded layer video sequence are included in one or more parameter sets and/or a general constraint information syntax structure.

Figure 7C:
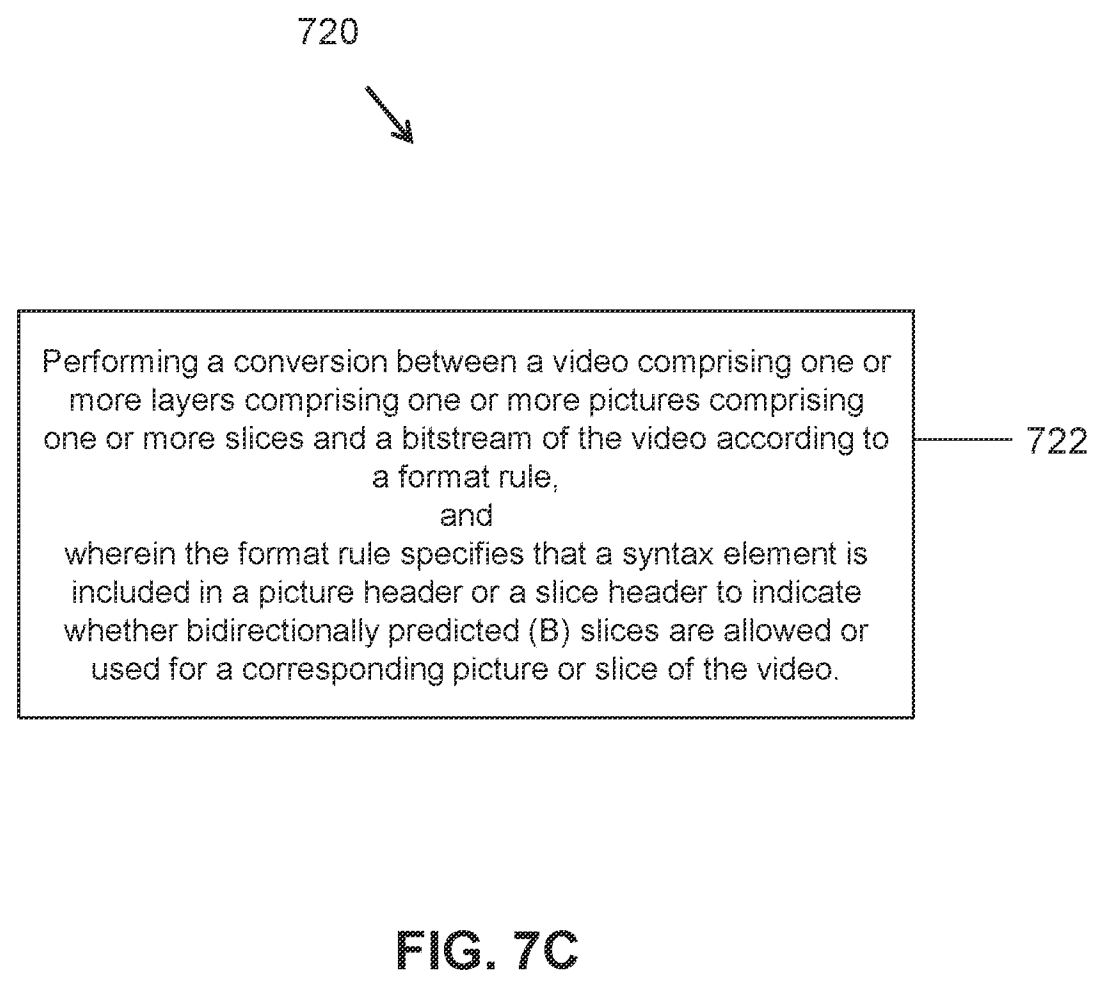

Performing a conversion between a video comprising one or more layers comprising one or more pictures comprising one or more slices and a bitstream of the video according to a format rule;

and wherein the format rule specifies that a syntax element is included in a picture header or a slice header to indicate whether bidirectionally predicted (B) slices are allowed or used for a corresponding picture or slice of the video.

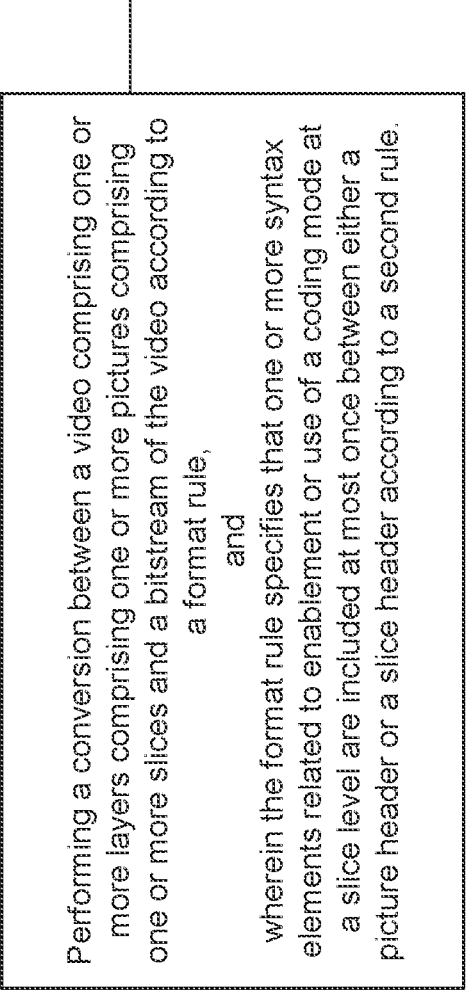

Performing a conversion between a video comprising one or more layers comprising one or more pictures comprising one or more slices and a bitstream of the video according to a format rule, and wherein the format rule specifies that one or more syntax elements related to enablement or use of a coding mode at a slice level are included at most once between either a picture header or a slice header according to a second rule.

Performing a conversion between a video comprising one or more pictures and a bitstream of the video according to a format rule, and wherein the format rule specifies to set, based on a picture order count value of a current picture, a value of a variable that indicates whether pictures in a decoded picture buffer prior to the current picture in decoding order in the bitstream are output before the pictures are removed from the decoded picture buffer.

Performing a conversion between a video comprising one or more pictures and a bitstream of the video according to a format rule, and wherein the format rule specifies that a picture type and an enablement of a layer independency control i) whether to include a syntax element indicating an inter slice or B slice or P slice is allowed in a picture and/or prediction information and/or ii) an indication of presence of the prediction information.

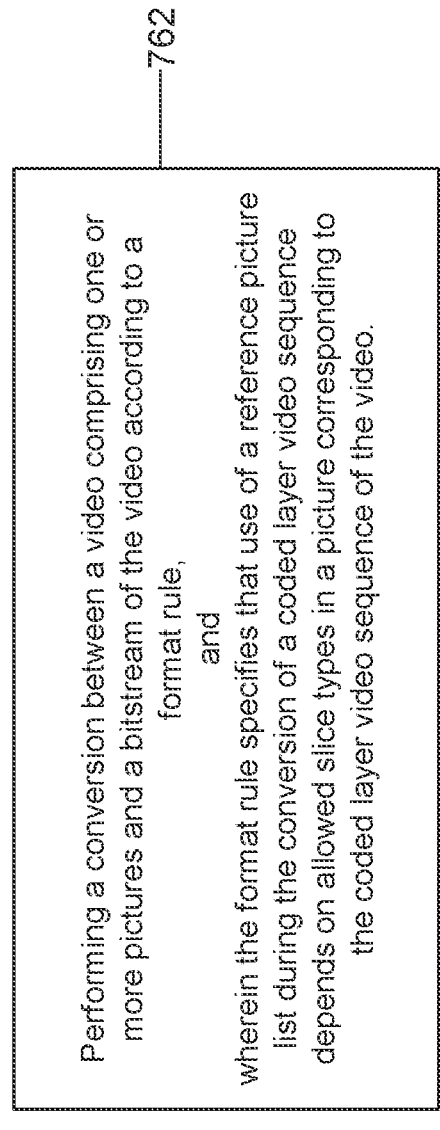

762

Performing a conversion between a video comprising one or more pictures and a bitstream of the video according to a format rule, and wherein the format rule specifies that use of a reference picture list during the conversion of a coded layer video sequence depends on allowed slice types in a picture corresponding to the coded layer video sequence of the video.

Performing a conversion between a video and a bitstream of the video including one or more video sequences according to a format rule, and wherein the format rule specifies whether or under which condition two adaptation parameter sets in a video sequence or in the bitstream are allowed to have a same adaptation parameter set identifier.

780

782

Performing a conversion between a video and a bitstream of the video according to a format rule, and wherein the format rule specifies that a first parameter set and a second parameter set are dependent on each other such that whether or how to include a syntax element in the second parameter set is based on the first parameter set.

790

792

Performing a conversion between a video comprising one or more pictures, each picture comprising one or more subpictures, and a bitstream of the video according to a format rule, and wherein the format rule specifies a processing of a noncoded subpicture of a picture.

VIDEO CODING USING PARAMETER SETS

CROSS REFERENCE TO RELATED APPLICATIONS

This application is a continuation of U.S. patent application Ser. No. 17/957,139 filed on Sep. 30, 2022, which is a continuation of International Patent Application No. PCT/US2021/025351, filed on Apr. 1, 2021 which claims the priority to and benefits of U.S. Application No. 63/006,054, filed on Apr. 6, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of video using control information useful for decoding of the coded representation.

In one example aspect, a video processing method is disclosed. The method includes performing a conversion between a video comprising one or more layers comprising one or more video regions and a coded representation of the video according to a format rule, wherein the format rule specifies that one or more syntax elements are included in the coded representation at the one or more video region level corresponding to allowed slice types for a corresponding video region.

In another example aspect, another video processing method is disclosed. The method includes performing a conversion between a video comprising one or more layers comprising one or more video pictures comprising one or more video slices and a coded representation of the video according to a format rule, wherein the format rule specifies that syntax elements related to enablement or use of a coding mode at a slice level are included at most once between either a picture header or a slice header according to a second rule.

In another example aspect, another video processing method is disclosed. The method includes performing a conversion between a video comprising one or more video pictures comprising one or more video slices and a coded representation of the video according to a format rule, wherein the format rule specifies that allowed slice types in a video picture controls whether a reference picture list is signaled in or generatable from the coded representation.

In another example aspect, another video processing method is disclosed. The method includes performing a conversion between a video comprising one or more video pictures comprising one or more subpictures wherein the coded representation conforms to a format rule, wherein the format rule specifies a processing of a noncoded subpicture of a video picture.

In another example aspect, another video processing method is disclosed. The method includes performing a conversion between a video comprising one or more pictures and a bitstream of the video according to a format rule, and wherein the format rule specifies that, in response to satisfying one or more conditions, a syntax element indicating whether a first syntax structure providing a profile, a tier and a level information and a second syntax structure providing decoded picture buffer information are present in a sequence parameter set is set to be equal to 1 to indicate that the first syntax structure and the second syntax structure are present in the sequence parameter set.

In another example aspect, another video processing method is disclosed. The method includes performing a conversion between a video and a bitstream of the video including one or more coded layers according to a format rule, and wherein the format rule specifies that one or more syntax elements that indicate allowed slice types in a picture of a coded layer video sequence are included in one or more parameter sets and/or a general constraint information syntax structure.

In another example aspect, another video processing method is disclosed. The method includes performing a conversion between a video comprising one or more layers comprising one or more pictures comprising one or more slices and a bitstream of the video according to a format rule, and wherein the format rule specifies that a syntax element is included in a picture header or a slice header to indicate whether bidirectionally predicted (B) slices are allowed or used for a corresponding picture or slice of the video.

In another example aspect, another video processing method is disclosed. The method includes performing a conversion between a video comprising one or more layers comprising one or more pictures comprising one or more slices and a bitstream of the video according to a format rule, and wherein the format rule specifies that one or more syntax elements related to enablement or use of a coding mode at a slice level are included at most once between either a picture header or a slice header according to a second rule.

In another example aspect, another video processing method is disclosed. The method includes performing a conversion between a video comprising one or more pictures and a bitstream of the video according to a format rule, and wherein the format rule specifies to set, based on a picture order count value of a current picture, a value of a variable that indicates whether pictures in a decoded picture buffer prior to the current picture in decoding order in the bitstream are output before the pictures are removed from the decoded picture buffer.

In another example aspect, another video processing method is disclosed. The method includes performing a conversion between a video comprising one or more pictures and a bitstream of the video according to a format rule, and wherein the format rule specifies that a picture type and an enablement of a layer independency control i) whether to include a syntax element indicating an inter slice or B slice or P slice is allowed in a picture and/or prediction information and/or ii) an indication of presence of the prediction information.

In another example aspect, another video processing method is disclosed. The method includes performing a conversion between a video comprising one or more pictures and a bitstream of the video according to a format rule, wherein the format rule specifies that use of a reference picture list during the conversion of a coded layer video sequence depends on allowed slice types in a picture corresponding to the coded layer video sequence of the video.

In another example aspect, another video processing method is disclosed. The method includes performing a conversion between a video and a bitstream of the video including one or more video sequences according to a format rule, and wherein the format rule specifies whether or under which condition two adaptation parameter sets in a video sequence or in the bitstream are allowed to have a same adaptation parameter set identifier.

In another example aspect, another video processing method is disclosed. The method includes performing a conversion between a video and a bitstream of the video according to a format rule, and wherein the format rule specifies that a first parameter set and a second parameter set are dependent on each other such that whether or how to include a syntax element in the second parameter set is based on the first parameter set.

In another example aspect, another video processing method is disclosed. The method includes performing a conversion between a video comprising one or more pictures, each picture comprising one or more subpictures, and a bitstream of the video according to a format rule, wherein the format rule specifies a processing of a noncoded subpicture of a picture.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present document.

BRIEF DESCRIPTION OF DRAWINGS

FIG. 7A to 7J are flowcharts for an example method of video processing based on some implementations of the disclosed technology.

DETAILED DESCRIPTION

Figure 1:
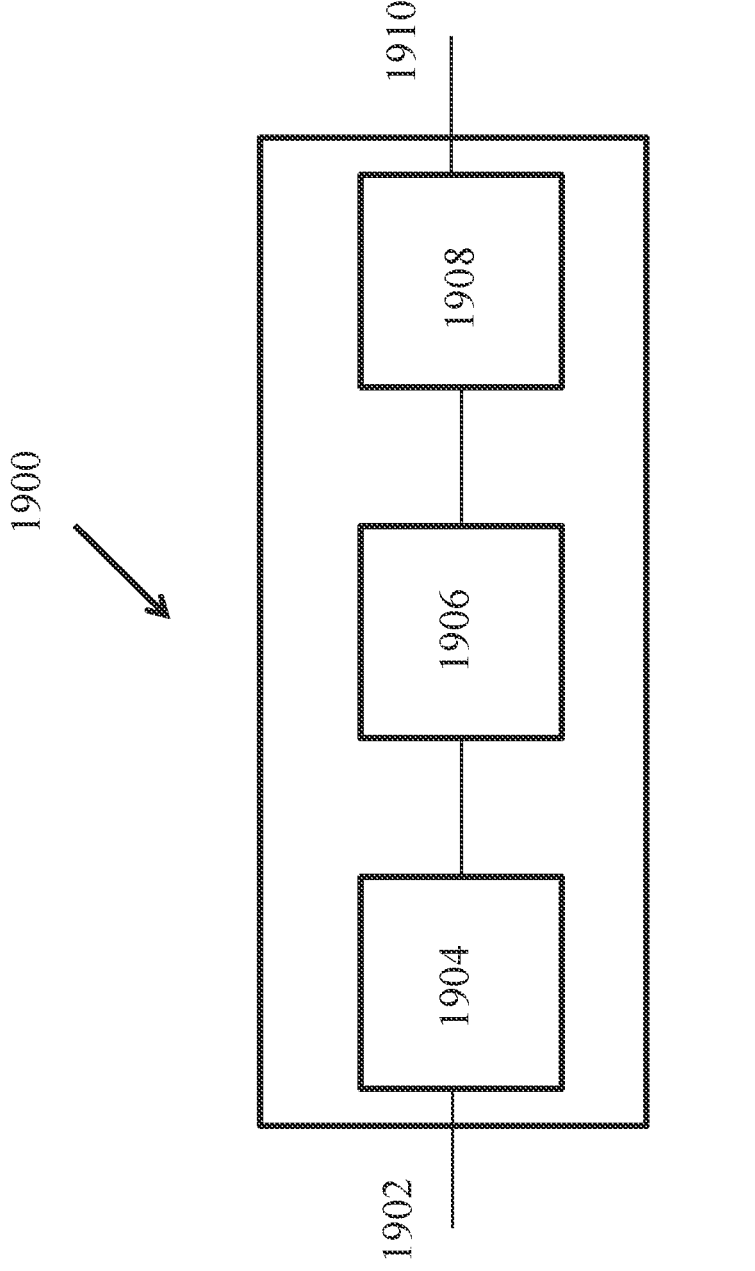
FIG. 1 is a block diagram of an example video processing system.
Figure 2:
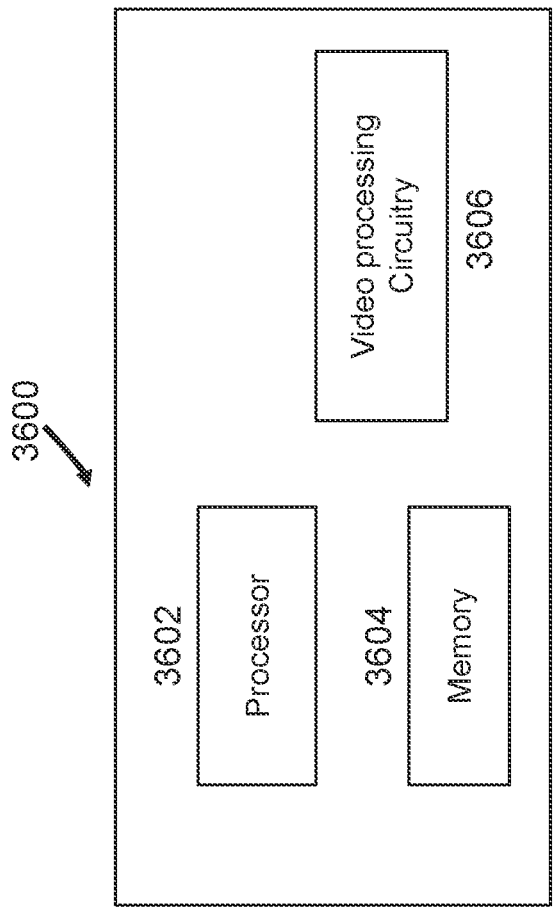
FIG. 2 is a block diagram of a video processing apparatus.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In this document, certain embodiments are shown as changes to the current VVC specification in which new text is added showing boldface italics and deleted text is marked with double brackets (e.g., [[a]] indicates the deletion of the character "a"). cl 1. Introduction This document is related to video coding technologies. Specifically, it is about improvements on signalling of allowed slice types and related coding tools that are only applicable to bi-predicted slices, and support of non-coded subpictures. The ideas may be applied individually or in various combination, to any video coding standard or non-standard video codec that supports multi-layer video coding, e.g., the being-developed Versatile Video Coding (VVC).

2. Abbreviations

ALF Adaptive Loop Filter
APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DCI Decoding Capability Information
DPB Decoded Picture Buffer
DU Decoding Unit
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
JEM Joint Exploration Model
LMCS Luma Mapping with Chroma Scaling
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RADL Random Access Decodable Leading (Picture)
RAP Random Access Point
RASL Random Access Skipped Leading (Picture)
RBSP Raw Byte Sequence Payload
RPL Reference Picture List
SAO Sample Adaptive Offset
SEI Supplemental Enhancement Information
SPS Sequence Parameter Set
STSA Step-wise Temporal Sublayer Access
SVC Scalable Video Coding
VCL Video Coding Layer
VPS Video Parameter Set
VTM VVC Test Model
VUI Video Usability Information
VVC Versatile Video Coding

3. Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The latest VVC working draft, JVET-Q2001_vE, could be downloaded from:

http://phenix.it-sudparis.eu/jvet/doc_end_user/documents/17_Brussels/wg11/JVET-Q2001-v15.zip The VVC project is now aiming for technical completion (FDIS) at the July 2020 meeting.

3.1. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signalling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.1.1. Video Parameter Set (VPS)

The syntax table and semantics of multiple syntax elements in the latest VVC draft text (JVET-Q2001-vE/v15) are defined as follows:

7.3.2.2 Video Parameter Set RBSP Syntax

| | Descriptor |
|---|---|
| video_parameter_set_rbsp( ) { | |
|   vps_video_parameter_set_id | u(4) |
|   vps_max_layers_minus1 | u(6) |
|   vps_max_sublayers_minus1 | u(3) |
|   if( vps_max_layers_minus1 > 0 && | |
| vps_max_sublayers_minus1 > 0 ) | |
|     vps_all_layers_same_num_sublayers_flag | u(1) |
|   if( vps_max_layers_minus1 > 0 ) | |
|     vps_all_independent_layers_flag | u(1) |
|   ... | |
|   if( !vps_all_independent_layers_flag ) | |
|     vps_num_dpb_params | ue(v) |
|   if( vps_num_dpb_params > 0 && | |
| vps_max_sublayers_minus1 > 0 ) | |
|     vps_sublayer_dpb_params_present_flag | u(1) |
|   for( i = 0; i < vps_num_dpb_params; i++ ) { | |
|     if( vps_max_sublayers_minus1 > 0 && | |
|     !vps_all_layers_same_num_sublayers_flag ) | |
|       dpb_max_temporal_id[ i ] | u(3) |
|     dpb_parameters( dpb_max_temporal_id[ i ], | |
|     vps_sublayer_dpb_params_present_flag ) | |
|   } | |
|   ... | |
| } | |

3.1.2. Sequence Parameter Set (SPS)

The syntax table and semantics of multiple syntax elements in the latest VVC draft text (JVET-Q2001-vE/v15) are defined as follows:

7.3.2.3 Sequence Parameter Set RBSP Syntax

| | Descriptor |
|---|---|
| seq_parameter_set_rbsp( ) { | |
|   sps_seq_parameter_set_id | u(4) |
|   sps_video_parameter_set_id | u(4) |
|   ... | |
|   sps_entropy_coding_sync_enabled_flag | u(1) |
|   if( sps_entropy_coding_sync_enabled_flag ) | |
|     sps_wpp_entry_point_offsets_present_flag | u(1) |
|   sps_weighted_pred_flag | u(1) |
|   sps_weighted_bipred_flag | u(1) |
|   log2_max_pic_order_cnt_lsb_minus4 | u(4) |
|   sps_poc_msb_flag | u(1) |
|   if( sps_poc_msb_flag ) | |
|     poc_msb_len_minus1 | ue(v) |
|   num_extra_ph_bits_bytes | u(2) |
|   extra_ph_bits_struct( num_extra_ph_bits_bytes ) | |
|   num_extra_sh_bits_bytes | u(2) |
|   extra_sh_bits_struct( num_extra_sh_bits_bytes ) | |
|   if( sps_max_sublayers_minus1 > 0 ) | |

-continued

| | Descriptor |
|---|---|
|    sps_sublayer_dpb_params_flag | u(1) |
| if( sps_ptl_dpb_hrd_params_present_flag ) | |
|    dpb_parameters( sps_max_sublayers_minus1, sps_sublayer_dpb_params_flag ) | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < rpl1_same_as_rpl0_flag ? 1 : 2; i++ ) { | |
|   num_ref_pic_lists_in_sps[ i ] | ue(v) |
|   for( j = 0; j < num_ref_pic_lists_in_sps[ i ]; j++) | |
|     ref_pic_list_struct( i, j ) | |
| } | |
| ... | |
|    sps_amvr_enabled_flag | u(1) |
|    sps_bdof_enabled_flag | u(1) |
| if( sps_bdof_enabled_flag ) | |
|    sps_bdof_pic_present_flag | u(1) |
| sps_smvd_enabled_flag | u(1) |
| sps_dmvr_enabled_flag | u(1) |
| if( sps_dmvr_enabled_flag) | |
|    sps_dmvr_pic_present_flag | u(1) |
| sps_mmvd_enabled_flag | u(1) |
| ... | |
| if( sps_transform_skip_enabled_flag || sps_palette_enabled_flag ) | |
|    min_qp_prime_ts_minus4 | ue(v) |
| sps_bcw_enabled_flag | u(1) |
| sps_ibc_enabled_flag | u(1) |
| if( sps_ibc_enabled_flag ) | |
|    six_minus_max_num_ibc_merge_cand | ue(v) |
| sps_ciip_enabled_flag | u(1) |
| if( sps_mmvd_enabled_flag ) | |
|    sps_fpel_mmvd_enabled_flag | u(1) |
| if( MaxNumMergeCand >= 2 ) { | |
|    sps_gpm_enabled_flag | u(1) |
|    if( sps_gpm_enabled_flag && MaxNumMergeCand >= 3 ) | |
|     max_num_merge_cand_minus_max_num_gpm_cand | ue(v) |
| } | |
| ... | |
| } | |

3.1.3. General Constraint Flag

7.3.3.2 General Constraint Information Syntax

| | Descriptor |
|---|---|
| general_constraint_info( ) { | |
| ... | |
|    general_non_projected_constraint_flag | u(1) |
|    intra_only_constraint_flag | u(1) |
|    max_bitdepth_constraint_idc | u(4) |
|    max_chroma_format_constraint_idc | u(2) |
|    no_res_change_in_clvs_constraint_flag | u(1) |
|    one_tile_per_pic_constraint_flag | u(1) |
|    one_slice_per_pic_constraint_flag | u(1) |
|    one_subpic_per_pic_constraint_flag | u(1) |
|    no_qtbtt_dual_tree_intra_constraint_flag | u(1) |
|    no_partition_constraints_override_constraint_flag | u(1) |
|    no_sao_constraint_flag | u(1) |
|    no_alf_constraint_flag | u(1) |
|    no_ccalf_constraint_flag | u(1) |
|    no_joint_cbcr_constraint_flag | u(1) |
|    no_ref_wraparound_constraint_flag | u(1) |
|    no_temporal_mvp_constraint_flag | u(1) |
|    no_sbtmvp_constraint_flag | u(1) |
|    no_amvr_constraint_flag | u(1) |
|    no_bdof_constraint_flag | u(1) |
|    no_dmvr_constraint_flag | u(1) |
|    no_cclm_constraint_flag | u(1) |
|    no_mts_constraint_flag | u(1) |
|    no_sbt_constraint_flag | u(1) |
|    no_affine_motion_constraint_flag | u(1) |
|    no_bcw_constraint_flag | u(1) |

-continued

| | Descriptor |
|---|---|
|    no_ibc_constraint_flag | u(1) |
|    no_ciip_constraint_flag | u(1) |
|    no_fpel_mmvd_constraint_flag | u(1) |
|    no_gpm_constraint_flag | u(1) |
| ... | |
| } | | no_bdof_constraint_flag equal to 1 specifies that sps_bdof_enabled_flag shall be equal to 0. no_bdof_constraint_flag equal to 0 does not impose such a constraint.

no_dmvr_constraint_flag equal to 1 specifies that sps_dmvr_enabled_flag shall be equal to 0. no_dmvr_constraint_flag equal to 0 does not impose such a constraint.

no_bcw_constraint_flag equal to 1 specifies that sps_bcw_enabled_flag shall be equal to 0. no_bcw_constraint_flag equal to 0 does not impose such a constraint.

no_ciip_constraint_flag equal to 1 specifies that sps_ciip_enabled_flag shall be equal to 0. no_cipp_constraint_flag equal to 0 does not impose such a constraint.

no_gpm_constraint_flag equal to 1 specifies that sps_gpm_enabled_flag shall be equal to 0. no_gpm_constraint_flag equal to 0 does not impose such a constraint.

3.1.4. Picture Parameter Set (PPS)

The syntax table and semantics of multiple syntax elements in the latest VVC draft text (JVET-Q2001-vE/v15) are defined as follows:

7.3.2.4 Picture Parameter Set RBSP Syntax

| | Descriptor |
|---|---|
| pic_parameter_set_rbsp( ) { | |
|   pps_pic_parameter_set_id | ue(v) |
|   pps_seq_parameter_set_id | u(4) |
|   mixed_nalu_types_in_pic_flag | u(1) |
|   ... | |
|   cabac_init_present_flag | u(1) |
|   for( i = 0; i < 2; i++ ) | |
|     num_ref_idx_default_active_minus1[ i ] | ue(v) |
|   ... | |
|   pps_weighted_pred_flag | u(1) |
|   pps_weighted_bipred_flag | u(1) |
|   deblocking_filter_control_present_flag | u(1) |
|   ... | |
| } | | num_ref_idx_default_active_minus1[i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0. The value of num_ref_idx_default_active_minus1[i] shall be in the range of 0 to 14, inclusive.

pps_weighted_bipred_flag equal to 0 specifies that explicit weighted prediction is not applied to B slices referring to the PPS. pps_weighted_bipred_flag equal to 1 specifies that explicit weighted prediction is applied to B slices referring to the PPS. When sps_weighted_bipred_flag is equal to 0, the value of pps_weighted_bipred_flag shall be equal to 0.

3.1.5. DPB Parameters Syntax

The syntax table and semantics of multiple syntax elements in the latest VVC draft text (JVET-Q2001-vE/v15) are defined as follows:

7.3.4 DPB Parameters Syntax

| | Descriptor |
|---|---|
| dpb_parameters( maxSubLayersMinus1, subLayerInfoFlag ) { | |
|   for( i = ( subLayerInfoFlag ? 0 : maxSubLayersMinus1 ); | |
|     i <= maxSubLayersMinus1; i++ ) { | |
|     max_dec_pic_buffering_minus1[ i ] | ue(v) |
|     max_num_reorder_pics[ i ] | ue(v) |
|     max_latency_increase_plus1[ i ] | ue(v) |
|   } | |
| } | |

7.4.5 DPB Parameters Semantics

The dpb_parameters( ) syntax structure provides information of DPB size, maximum picture reorder number, and maximum latency for one or more OLSs.

When a dpb_parameters( ) syntax structure is included in a VPS, the OLSs to which the dpb_parameters( ) syntax structure applies are specified by the VPS. When a dpb_parameters ( )syntax structure is included in an SPS, it applies to the OLS that includes only the layer that is the lowest layer among the layers that refer to the SPS, and this lowest layer is an independent layer.

max_dec_pic_buffering_minus1[i] plus 1 specifies the maximum required size of the DPB in units of picture storage buffers when Htid is equal to i. The value of max_dec_pic_buffering_minus1[i] shall be in the range of 0 to MaxDpbSize−1, inclusive, where MaxDpbSize is as specified in clause A.4.2. When i is greater than 0, max_dec_pic_buffering_minus1[i] shall be greater than or equal to max_dec_pic_buffering_minus1[i−1]. When max_dec_pic_buffering_minus1[i] is not present for i in the range of 0 to maxSubLayersMinus1 −1, inclusive, due to subLayerInfoFlag being equal to 0, it is inferred to be equal to max_dec_pic_buffering_minus1[maxSubLayersMinus1].

max_num_reorder_pics[i] specifies the maximum allowed number of pictures of the OLS that can precede any picture in the OLS in decoding order and follow that picture in output order when Htid is equal to i. The value of max_num_reorder_pics[i] shall be in the range of 0 to max_dec_pic_buffering_minus1[i], inclusive. When i is greater than 0, max_num_reorder_pics[i] shall be greater than or equal to max_num_reorder_pics[i−1]. When max_num_reorder_pics[i] is not present for i in the range of 0 to maxSubLayersMinus1−1, inclusive, due to subLayerInfoFlag being equal to 0, it is inferred to be equal to max_num_reorder_pics[maxSubLayersMinus1].

max_latency_increase_plus1[i] not equal to 0 is used to compute the value of MaxLatencyPictures[i], which specifies the maximum number of pictures in the OLS that can precede any picture in the OLS in output order and follow that picture in decoding order when Htid is equal to i. When max_latency_increase_plus1[i] is not equal to 0, the value of MaxLatencyPictures[i] is specified as follows:

$$MaxLatencyPictures[i] = max\_num\_reorder\_pics[i] + max\_latency\_increase\_plus1[i] - 1 \quad (7\text{-}110)$$

When max_latency_increase_plus1[i] is equal to 0, no corresponding limit is expressed. The value of max_latency_increase_plus1[i] shall be in the range of 0 to $2^{32}-2$, inclusive. When max_latency_increase_plus1[i] is not present for i in the range of 0 to maxSubLayersMinus1 −1, inclusive, due to subLayerInfoFlag being equal to 0, it is inferred to be equal to max_latency_increase_plus1[maxSubLayersMinus1].

3.2. Picture Header (PH) and Slice Header (SH) in VVC

Similarly as in HEVC, the slice header in VVC conveys information for a particular slice. This includes slice address, slice type, slice QP, picture order count (POC) least significant bits (LSBs), RPS and RPL information, weighted prediction parameters, loop filtering parameters, entry offsets of tiles and WPP, etc.

VVC introduced the picture header (PH), which contains header parameters for a particular picture. Each picture must have one or only one PH. The PH basically carries those parameters that would have been in the slice header if PH were not introduced but each has the same value for all slices of a picture. These include IRAP/GDR picture indications, inter/intra slices allowed flags, POC LSB and optionally POC MSB, information on RPLs, deblocking, SAO, ALF, QP delta, and weighted prediction, coding block partitioning information, virtual boundaries, co-located picture information, etc. It often occurs that each picture in an entire sequence of pictures contains only one slice. To allow not to have at least two NAL units for each picture in such cases, the PH syntax structure is allowed to be included either the PH NAL unit or in the slice header.

In VVC, information on the collocated picture, which is used for temporal motion vector prediction, is signalled either in the picture header or the slice header.

3.2.1. Picture Header (PH)

The syntax table and semantics of multiple syntax elements in the latest VVC working draft ( ) are defined as follows:

7.3.2.7 Picture Header Structure Syntax

| | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   non_reference_picture_flag | u(1) |
|   ... | |
|     if( sps_temporal_mvp_enabled_flag ) { | |
|       ph_temporal_mvp_enabled_flag | u(1) |
|       if( ph_temporal_mvp_enabled_flag && | |
| rpl_info_in_ph_flag ) { | |
|         ph_collocated_from_l0_flag | u(1) |
|         if( ( ph_collocated_from_l0_flag && | |
| num_ref_entries[ 0 ][ RplsIdx[ 0 ] ] > 1 ) \|\| | |
|           ( !ph_collocated_from_l0_flag | |
| && | |
| num_ref_entries[ 1 ][ RplsIdx[ 1 ] ] > 1 ) ) | |
|           ph_collocated_ref_idx | ue(v) |
|       } | |
|     } | |
|   ... | |

-continued

| | Descriptor |
|---|---|
|     mvd_l1_zero_flag | u(1) |
|     if( sps_fpel_mmvd_enabled_flag ) | |
|       ph_fpel_mmvd_enabled_flag | u(1) |
|     if( sps_bdof_pic_present_flag ) | |
|       ph_disable_bdof_flag | u(1) |
|     if( sps_dmvr_pic_present_flag ) | |
|       ph_disable_dmvr_flag | u(1) |
|     if( sps_prof_pic_present_flag ) | |
|       ph_disable_prof_flag | u(1) |
|     if( ( pps_weighted_pred_flag \|\| | |
| pps_weighted_bipred_flag ) | |
| && wp_info_in_ph_flag ) | |
|       pred_weight_table( ) | |
|     } | |
|   ... | |

3.2.2. Slice Header (SH)

The syntax table and semantics of multiple syntax elements in the latest VVC working draft ( ) are defined as follows:

7.3.7.1 General Slice Header Syntax

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) | |
| \|\| | |
|     ( !rect_slice_flag && NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag && NumTilesInPic > 1 ) | |
|     num_tiles_in_slice_minus1 | ue(v) |
|   if( ph_inter_slice_allowed_flag ) | |
|     slice_type | ue(v) |
|   if( sps_alf_enabled_flag && !alf_info_in_ph_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|       if( sps_ccalf_enabled_flag ) { | |
|         slice_cc_alf_cb_enabled_flag | u(1) |
|         if( slice_cc_alf_cb_enabled_flag ) | |
|           slice_cc_alf_cb_aps_id | u(3) |
|         slice_cc_alf_cr_enabled_flag | u(1) |
|         if( slice_cc_alf_cr_enabled_flag ) | |
|           slice_cc_alf_cr_aps_id | u(3) |
|       } | |
|     } | |
|   } | |
|   if( separate_colour_plane_flag = = 1 ) | |
|     colour_plane_id | u(2) |
|   if( !rpl_info_in_ph_flag && ( ( nal_unit_type != IDR_W_RADL | |
| && nal_unit_type != | |
|     IDR_N_LP ) \|\| sps_idr_rpl_present_flag ) ) | |
|     ref_pic_lists( ) | |
|   if( (rpl_info_in_ph_flag \|\| ( ( nal_unit_type != IDR_W_RADL | |
| && nal_unit_type != | |
|     IDR_N_LP ) \|\| sps_idr_rpl_present_flag ) ) && | |
|     ( ( slice_type != I && | |
| num_ref_entries[ 0 ][ RplsIdx[ 0 ] ] > 1 ) \|\| | |
|     ( slice_type = = B && | |

-continued

| | Descriptor |
|---|---|
| num_ref_entries[ 1 ][ RplsIdx[ 1 ] ] > 1 ) ) ) { | |
|     num_ref_idx_active_override_flag | u(1) |
|     if( num_ref_idx_active_override_flag ) | |
|       for( i = 0; i < ( slice_type = = B ? 2: 1 ); i++ ) | |
|         if( num_ref_entries[ i ][ RplsIdx[ i ] ] > 1 ) | |
|           num_ref_idx_active_minus1[ i ] | ue(v) |
| } | |
|   if( slice_type != I ) { | |
|     if( cabac_init_present_flag ) | |
|       cabac_init_flag | u(1) |
|     if( ph_temporal_mvp_enabled_flag && !rpl_info_in_ph_flag ) | |
| { | |
|       if( slice_type = = B ) | |
|         slice_collocated_from_l0_flag | u(1) |
|       if( (slice_collocated_from_l0_flag && | |
| NumRefIdxActive[ 0 ] > 1 ) \| \| | |
|         (! slice_collocated_from_l0_flag && | |
| NumRefIdxActive[ 1 ] > 1 ) ) | |
|         slice_collocated_ref_idx | ue(v) |
|     } | |
|     if( !wp_info_in_ph_flag && ( ( pps_weighted_pred_flag && | |
| slice_type = = P ) \| \| | |
|       ( pps_weighted_bipred_flag && slice_type = = | |
| B ) ) ) | |
|       pred_weight_table( ) | |
|   } | |
|   if( !qp_delta_info_in_ph_flag ) | |
|     slice_qp_delta | se(v) |
|   if( pps_slice_chroma_qp_offsets_present_flag ) { | |
|     slice_cb_qp_offset | se(v) |
|     slice_cr_qp_offset | se(v) |
|     if( sps_joint_cbcr_enabled_flag ) | |
|       slice_joint_cbcr_qp_offset | se(v) |
|   } | |
|   if( pps_cu_chroma_qp_offset_list_enabled_flag ) | |
|     cu_chroma_qp_offset_enabled_flag | u(1) |
|   if( sps_sao_enabled_flag && !sao_info_in_ph_flag ) { | |
|     slice_sao_luma_flag | u(1) |
|     if( ChromaArrayType != 0 ) | |
|       slice_sao_chroma_flag | u(1) |
|   } | |
| ... | |
| } | | slice_type specifies the coding type of the slice according to Table 9.

TABLE 9

| Name association to slice_type | |
|---|---|
| slice_type | Name of slice_type |
| 0 | B (B slice) |
| 1 | P (P slice) |
| 2 | I (I slice) |

When not present, the value of slice_type is inferred to be equal to 2.

When ph_intra_slice_allowed_flag is equal to 0, the value of slice_type shall be equal to 0 or 1. When nal_unit_type is in the range of IDR_W_RADL to CRA_NUT, inclusive, and vps_independent_layer_flag[GeneralLayerIdx[nuh_layer_id]] is equal to 1, slice_type shall be equal to 2.

3.3. Recent Progress in JVET-R0052

In JVET-R0052 method #2, it is proposed to add one allowed type index (i.e., ph_allowed_slice_types_idc), and whether B slices are used in a picture could be derived from the newly added syntax element.

| ph_allowed_slice_types_idc | allowed values of slice types |
|---|---|
| 0 | 1, 2 (P, I) |
| 1 | 0, 2 (B, I) |
| 2 | 0, 1 (B, P) |
| 3 | 0, 1, 2 (B, P, I) |

In addition, another new syntax element ph_multiple_slice_types_in_pic_flag is added to the PH structure for specifying whether more than one slice types may be present in the current picture. ph_multiple_slice_types_in_pic_flag equal to 1 specifies that coded slices of the picture may have different values of slice_type. ph_multiple_slice_types_in_pic_flag equal to 0 specifies that all coded slices of the picture have the same value of slice_type. When ph_multiple_slice_types_in_pic_flag is equal to 0, ph_slice_type is further signalled to specify the value of slice_type for all slices of the picture and slice_type in the slice header is not coded and is inferred to be equal to the value of ph_slice_type.

7.3.2.7 Picture Header Structure Syntax

|  | Descriptor |
|---|---|
| picture_header_structure( ) { |  |
|    gdr_or_irap_pic_flag | u(1) |
|    if( gdr_or_irap_pic_flag ) |  |
|      gdr_pic_flag | u(1) |
|    if( !no_pic_partition_flag && |  |
|      !( rect_slice_flag && num_slices_in_pic_minus1 = = 0 ) ) |  |
|    [[ph_inter_slice_allowed_flag]] | u(1) |
| ph_multiple_slice_types_in_pic_flag |  |
|    if( [[ph_inter_slice_allowed_flag]] |  |
| ph_multiple_slice_types_in_pic_flag ) |  |
|      [[ph_intra_slice_allowed_flag]] ph_allowed_slice_types_idc | u(2) |
|    else |  |
|      ph_slice_type | ue(v) |
|    non_reference_picture_flag | u(1) |
|    ph_pic_parameter_set_id | ue(v) |
|    ..... |  |
|    if( partition_constraints_override_enabled_flag ) |  |
|      partition_constraints_override_flag | u(1) |
|    if( [[ph_intra_slice_allowed_flag]] ISliceAllowed ) { |  |
|      if( partition_constraints_override_flag ) { |  |
|        ph_log2_diff_min_qt_min_cb_intra_slice_luma | ue(v) |
|        ph_max_mtt_hierarchy_depth_intra_slice_luma | ue(v) |
|        if( ph_max_mtt_hierarchy_depth_intra_slice_luma != |  |
| 0 ) { |  |
|      ph_log2_diff_max_bt_min_qt_intra_slice_luma | ue(v) |
|        ph_log2_diff_max_tt_min_qt_intra_slice_luma | ue(v) |
|        } |  |
|        if( qtbtt_dual_tree_intra_flag ) { |  |
|      ph_log2_diff_min_qt_min_cb_intra_slice_chroma | ue(v) |
|      ph_max_mtt_hierarchy_depth_intra_slice_chroma | ue(v) |
|      if( ph_max_mtt_hierarchy_depth_intra_slice_chroma != 0 ) { |  |
|      ph_log2_diff_max_bt_min_qt_intra_slice_chroma | ue(v) |
|      pb_log2_diff_max_tt_min_qt_intra_slice_chroma | ue(v) |
|        } |  |
|        } |  |
|      } |  |
|      if( cu_qp_delta_enabled_flag ) |  |
|        ph_cu_qp_delta_subdiv_intra_slice | ue(v) |
|      if( pps_cu_chroma_qp_offset_list_enabled_flag ) |  |
|        ph_cu_chroma_qp_offset_subdiv_intra_slice | ue(v) |
|    } |  |
|    if( [[ph_inter_slice_allowed_flag]] BSliceAllowed \| \| |  |
| PSliceAllowed ) { |  |
|      if( partition_constraints_override_flag ) { |  |
|        ph_log2_diff_min_qt_min_cb_inter_slice | ue(v) |
|        ph_max_mtt_hierarchy_depth_inter_slice | ue(v) |
|        if( ph_max_mtt_hierarchy_depth_inter_slice != 0 ) { |  |
|          ph_log2_diff_max_bt_min_qt_inter_slice | ue(v) |
|          ph_log2_diff_max_tt_min_qt_inter_slice | ue(v) |
|        } |  |
|      } |  |
|      if( cu_qp_delta_enabled_flag ) |  |
|        ph_cu_qp_delta_subdiv_inter_slice | ue(v) |
|      if( pps_cu_chroma_qp_offset_list_enabled_flag ) |  |
|        ph_cu_chroma_qp_offset_subdiv_inter_slice | ue(v) |
|      if( sps_temporal_mvp_enabled_flag ) { |  |
|        ph_temporal_mvp_enabled_flag | u(1) |
|        if( ph_temporal_mvp_enabled_flag && |  |
| rpl_info_in_ph_flag ) { |  |
|        if( BSliceAllowed ) |  |
|          ph_collocated_from_l0_flag | u(1) |
|        if( ( ph_collocated_from_l0_flag && |  |
| num_ref_entries[ 0 ][ RplsIdx[ 0 ] ] > 1 ) \| \| |  |
|        ( !ph_collocated_from_l0_flag |  |
| && |  |
| num_ref_entries[ 1 ][ RplsIdx[ 1 ] ] > 1 ) ) |  |
|          ph_collocated_ref_idx | ue(v) |
|        } |  |
|      } |  |
|      if( BSliceAllowed ) |  |
|        mvd_l1_zero_flag | u(1) |
|      if( sps_fpel_mmvd_enabled_flag ) |  |
|        ph_fpel_mmvd_enabled_flag | u(1) |
|      if( sps_bdof_pic_present_flag && BSliceAllowed ) |  |
|        ph_disable_bdof_flag | u(1) |
|      if( sps_dmvr_pic_present_flag && BSliceAllowed ) |  |
|        ph_disabled_mvr_flag | u(1) |

-continued

| | Descriptor |
|---|---|
| if( sps_prof_pic_present_flag ) | |
| ph_disable_prof_flag | u(1) |
| if( (( pps_weighted_pred_flag && PSliceAllowed ) \| \| | |
| ( pps_weighted_bipred_flag && BSliceAllowed )) && wp_info_in_ph_flag ) | |
| pred_weight_table( ) | |
| } | |
| ..... | |
| } | |

7.3.7.1 General Slice Header Syntax

| | Descriptor |
|---|---|
| slice_header( ) { | |
| picture_header_in_slice_header_flag | u(1) |
| if( picture_header_in_slice_header_flag ) | |
| picture_header_structure( ) | |
| if( subpic_info_present_flag ) | |
| slice_subpic_id | u(v) |
| if( ( rect_slice_flag && NumSlicesInSubpic[ CurrSubpicIdx ] > 1 ) | |
| \| \| | |
| ( !rect_slice_flag && NumTilesInPic > 1 ) ) | |
| slice_address | u(v) |
| for( i = 0; i < NumExtraShBits; i++ ) | |
| sh_extra_bit[ i ] | u(1) |
| if( !rect_slice_flag && NumTilesInPic > 1 ) | |
| num_tiles_in_slice_minus1 | ue(v) |
| if( [[ph_inter_slice_allowed_flag]] | |
| ph_multiple_slice_types_in_pic_flag ) | |
| if( ph_allowed_slice_types_idc == 3 ) | |
| slice_type | ue(v) |
| else | |
| slice_type_modified | u(1) |
| ..... | |
| } | |

7.3.7.2 Weighted Prediction Parameters Syntax

| | Descriptor |
|---|---|
| pred_weight_table( ) { | |
| luma_log2_weight_denom | ue(v) |
| if( ChromaArrayType != 0 ) | |
| delta_chroma_log2_weight_denom | se(v) |
| if( wp_info_in_ph_flag ) | |
| num_l0_weights | ue(v) |
| for( i = 0; i < NumWeightsL0; i++ ) | |
| luma_weight_l0_flag[ i ] | u(1) |
| if( ChromaArrayType != 0 ) | |
| for( i = 0; i < NumWeightsL0; i++ ) | |
| chroma_weight_l0_flag[ i ] | u(1) |
| for( i = 0; i < NumWeightsL0; i++ ) { | |
| if( luma_weight_l0_flag[ i ] ) { | |
| delta_luma_weight_l0[ i ] | se(v) |
| luma_offset_l0[ i ] | se(v) |
| } | |
| if( chroma_weight_l0_flag[ i ] ) | |
| for( j = 0; j < 2; j++ ) { | |
| delta_chroma_weight_l0[ i ][ j ] | se(v) |
| delta_chroma_offset_l0[ i ][ j ] | se(v) |
| } | |
| } | |
| if( pps_weighted_bipred_flag && ( | |
| wp_info_in_ph_flag && BSliceAllowed ) ) | |
| num_l1_weights | ue(v) |
| for( i = 0; i < NumWeightsL1; i++ ) | |
| luma_weight_l1_flag[ i ] | u(1) |
| if( ChromaArrayType != 0 ) | |
| for( i = 0; i < NumWeightsL1; i++ ) | |
| chroma_weight_l1_flag[ i ] | u(1) |

-continued

| | Descriptor |
|---|---|
| for( i = 0; i < NumWeightsL1; i++ ) { | |
| if( luma_weight_l1_flag[ i ] ) { | |
| delta_luma_weight_l1[ i ] | se(v) |
| luma_offset_l1[ i ] | se(v) |
| } | |
| if( chroma_weight_l1_flag[ i ] ) | |
| for( j = 0; j < 2; j++ ) { | |
| delta_chroma_weight_l1[ i ][ j ] | se(v) |
| delta_chroma_offset_l1[ i ][ j ] | se(v) |
| } | |
| } | |
| } | |

7.4.3.7 Picture Header Structure Semantics

*ph_multiple_slice _types_in_pic _flag equal to 1 specifies that coded slices of the picture may have different values of slice_type. ph _multiple_slice _types_in_pic_flag equal to 0 specifies that all coded slices of the picture have the same value of slice_type. When ph_multiple _slice_types_in_pic _flag is not present, it is inferred to be equal to 0. ph_allowed_slice _types_idc specifies the allowed values of slice _type for coded slices in the picture according to Table X when ph_ multiple_slice_types_ in_pic_flag is equal to 1.*

TABLE X

| The allowed values of slice_type specified by ph_allowed_slice_types_idc | |
|---|---|
| ph_allowed_slice_types_idc | allowed values of slice types |
| 0 | 1, 2 (P, I) |
| 1 | 0, 2 (B, I) |
| 2 | 0, 1 (B, P) |
| 3 | 0, 1, 2 (B, P, I) |

*ph_slice_type specifies the value of slice_type for all slice headers in the picture when ph_muliple_slice_types _in_pic_flag is equal to 0. The variables BSliceAllowed, PSliceAllowed and ISlice Allowed are derived as follows:*
*If ph_multiple_slice_types _in_pic_flag is equal to 0, BSliceAllowed is set equal to ( ph_slice_type == B ), PSliceAllowed is set equal to ( ph_slice_type == P ), and ISliceAllowed is set equal to ( ph_slice_type == I ).*
*Otherwise, BSliceAllowed is set equal to ( ph_allowed _slice_types_idc != 0 ), PSliceAllowed is set equal to ( ph_allowed_slice_types_idc != 1 ), and ISliceAllowed is set equal to ( ph_allowed _slice_types_idc != 2 ).*
[[ph_inter_slice_allowed_flag equal to 0 specifies that all coded slices of the picture have slice_type equal to 2.

ph_inter_slice_allowed_flag equal to 1 specifies that there may or may not be one or more coded slices in the picture that have slice_type equal to 0 or 1. [Ed. (YK): Double check the need/correctness of the inference rules for those syntax elements conditioned out by this flag equal to 0.] ph_intra_slice_allowed_flag equal to 0 specifies that all coded slices of the picture have slice_type equal to 0 or 1. ph_intra_slice_allowed_flag equal to 1 specifies that there may or may not be one or more coded slices in the picture that have slice_type equal to 2. When not present, the value of ph_intra_slice_allowed_flag is inferred to be equal to 1. [Ed. (YK): Double check the need/correctness of the inference rules for those syntax elements conditioned out by this flag equal to 1.]]]

NOTE 2—For bitstreams that are supposed to work subpicture based bitstream merging without the need of changing PH NAL units, the encoder is expected to set the values of [[both ph_inter_slice_allowed_flag and ph_intra_slice_allowed_flag]]BSliceAllowed, PSliceAllowed, and ISliceAllowed equal to 1.

7.4.8.1 General Slice Header Semantics slice_type specifies the coding type of the slice according to Table 9.

TABLE 9

Name association to slice_type

| slice_type | Name of slice_type |
|------------|--------------------|
| 0 | B (B slice) |
| 1 | P (P slice) |
| 2 | I (I slice) |

When not present, the value of slice_types is [[inferred to be equal to 2]] derived as follows:

If ph_multiple_slice_types_in_pic_flag is equal to 1, the value of slice_type is set equal to (slice_type_modified>=ph_allowed_slice_types_idc ? slice_ type_modified+1: slice_type_modified).

Otherwise, the value of slice_type is set equal to the value of ph_slice_type.

*slice_type_modified is used for deriving the value of slice_type when ph_multiple _slice_types_in_pic _flag is equal to 1 and the value of ph _allowed_slice_types _idc is not equal to 3.*

[[When ph_intra_slice_allowed_flag is equal to 0, the value of slice_type shall be equal to 0 or 1.]]When nal_unit_type is in the range of IDR_W_RADL to CRA_NUT, inclusive, and vps_independent_layer_flag[GeneralLayerIdx[nuh_layer_id]] is equal to 1, slice_type shall be equal to 2.

7.4.8.2 Weighted Prediction Parameters Semantics num_l1_weights specifies the number of weights signalled for entries in reference picture list 1 when pps_weighted_bipred_flag and wp_info_in_ph_flag are both equal to 1. The value of num_l1_weights shall be in the range of 0 to Min(15, num_ref_entries[1][RplsIdx[1]]), inclusive. The variable NumWeightsL1 is derived as follows:

```
if( !pps_weighted_bipred_flag )
    NumWeightsL1 = 0
else if( wp_info_in_ph_flag )    (148)
    NumWeightsL1 = BSliceAllowed ? num_l1_weights : 0
else
    NumWeightsL1 = NumRefIdxActive[ 1 ]
```

A new syntax element pps_multiple_slice_types_in_pic_flag can be further signalled in the PPS. When pps_multiple_slice_types_in_pic_flag is equal to 0, ph_multiple_slice_types_in_pic_flag is inferred to be equal to 0 for all PHs referring to the PPS.

The related modifications to VVC Draft 8 are written in red and highlighted in yellow and are provided below:

7.3.2.4 Picture Parameter Set RBSP Syntax

| | Descriptor |
|---|---|
| pic_parameter_set_rbsp( ) { | |
|     pps_pic_parameter_set_id | ue(v) |
|     pps_seq_parameter_set_id | u(4) |
|     ... | |
|     no_pic_partition_flag | u(1) |
|     if( !no_pic_partition_flag ) { | |
|   .... | |
|   if( !(rect_slice_flag && | |
|   num_slices_in_pic_minus1 = = 0) ) | |
|     pps_multiple_slice_types_in_pic_flag | u(1) |
|       loop_filter_across_tiles_enabled_flag | u(1) |
|       loop_filter_across_slices_enabled_flag | u(1) |
|     } | |
|     ... | |
| } | |

PH of Method 1

7.3.2.7 Picture Header Structure Syntax

| | Descriptor |
|---|---|
| picture_header_structure( ) { | |
|     gdr_or_irap_pic_flag | u(1) |
|     if( gdr_or_irap_pic_flag ) | |
|       gdr_pic_flag | u(1) |
|     if( !no_pic_partition_flag && | |
| pps_multiple_slice_types_in_pic _flag && | |
|     !( rect_slice_flag && | |
|     num_slices_in_pic_minus1 = = 0 ) ) | |
|     [[ph_inter_slice_allowed_flag]] | u(1) |
|   ph_multiple_slice_types_in_pic_flag | |
|     if( [[ph_inter_slice_allowed_flag]] | |
|   ph_multiple_slice_types_in_pic_flag ) | |
|     ph_intra_slice_allowed_flag | u(1) |
|     else | |
|       ph_slice_type | ue(v) |
|     non_reference_picture_flag | u(1) |
|     ph_pic_parameter_set_id | ue(v) |
|   ..... | |
| } | |

PH of Method 2

| | Descriptor |
|---|---|
| picture_header_structure( ) { | |
|     gdr_or_irap_pic_flag | u(1) |
|     if( gdr_or_irap_pic_flag ) | |
|       gdr_pic_flag | u(1) |
|     if ( !no_pic_partition_flag && | |
| pps_multiple_slice_types_in_pic_flag && | |
|     !( rect_slice_flag && | |
|     num_slices_in_pic_minus1 = = 0 ) ) | |
|     [[ph_inter_slice_allowed_flag]] | u(1) |
|   ph_multiple_slice_types_in_pic_flag | |
|     if( [[ph_inter_slice_allowed_flag]] | |
|   ph_multiple_slice_types_in_pic flag ) | |
|     [[ph_intra_slice_allowed_flag]] | u(2) |
|     ph_allowed_slice_types_idc | |
|     else | |
|       ph_slice_type | ue(v) |
|     non_reference_picture_flag | u(1) |
|     ph_pic_parameter_set_id | ue(v) |

-continued

| | Descriptor |
|---|---|
| ..... | |
| } | 5 |

7.4.3.4 Picture Parameter Set RBSP Semantics

*pps_multiple_slice_types _in_pic_flag equal to 1*
*specifies that coded  slices of the picture*
*may have different values  of slice_type for all*
*pictures referring to  the PPS. pps_multiple*
*_slice_types_in_pic_flag  equal to 0 specifies that all*
*coded slices of the picture  have the same value of*
*slice_type for all pictures  referring to the PPS.  When*
*pps_multiple_slice_types_in _pic_flag is not present,*
*the value of pps_multiple _slice_types_in_pic*
*_flag is inferred  to be equal to 0.*

3.4. Uncoded Subpictures and Potential Applications in JVET-R0151

In this document it is shown how VVC can be extended with a mechanism that enables uncoded subpictures. Uncoded subpictures can be used for efficient coding when subpictures do not completely fill up a picture, by providing completely unused regions. Examples are shown for OMAF use cases, as well as for 360° video coding of 4×3 cubemaps. Further, uncoded subpictures can be used to reserve space which is filled not with coded data, but with content generated from already coded content. Here, the example of high-level, efficient geometry padding for 360° video is shown.

4. Technical Problems Solved by Disclosed Technical Solutions

The current VVC text and recent progress in JVET have the following problems:

1. In the latest VVC draft text (in JVET-Q2001-vE/v15), two PH syntax elements related to allowed slice types are included, i.e., ph_inter_slice_allowed_flag and ph_intra_slice_allowed_flag, as tabulated in the picture header structure syntax. With these two flags, syntax elements related to I slice coding are signalled only when the ph_intra_slice_allowed_flag is true, and syntax elements related to inter slice coding are signalled only when the ph_inter_slice_allowed_flag is true. However, when ph_inter_slice_allowed_flag is equal to 1, the decoder does not know whether the picture contains B slices. Some applications, e.g., online gaming, video conference, video surveillance, often use only P and I slices. Therefore, if there is an indication of whether B slices are allowed, the decoders of such applications would be able to choose to only request/ use bitstreams that do not B slices included, and in addition, the indication can be used to avoid sending of multiple unnecessary parameters.

2. In JVET-R0052, the suggested changes are only applied to PH and SH. There is no higher-level control whether it can only have the same slice types within a picture or not and/or what kinds of allowed slice types are enabled in a picture. In addition, when certain syntax elements related to bi-prediction only are not present, how to infer the values are not described.

3. In the item 1 of JVET-R0191, it is proposed to replace the constraint that the value of sps_ptl_dpb_hrd_params_present_flag shall be equal to vps_independent_layer_flag[GeneralLayerIdx[nuh_layer_id]] with the following: The value of sps_ptl_dpb_hrd_params_present_flag shall be equal to 1 when there is an OLS that contains only one layer and the layer ID is equal to nuh_layer_id of the SPS. However, the change introduces a VPS dependency through the condition "when there is an OLS that contains only one layer". Another issue is that for a single-layer bitstream, the value of sps_ptl_dpb_hrd_params_present_flag shall be equal to 1, and this is not captured by the changed constraint.

5. A Listing of Example Solutions and Embodiments

To solve the above problem, methods as summarized below are disclosed. The items below should be considered as examples to explain the general concepts and should not be interpreted in a narrow way. Furthermore, these items can be applied individually or combined in any manner.

One or more syntax elements may be added in parameter sets (e.g., SPS, VPS, PPS, APS, DCI) and/or General constraint information syntax to indicate whether only X (e.g., I, or B or P) slice is allowed within a picture; and/or to indicate the allowed set of slice types in a picture.

In Parameter Set and General Constraint Information Syntax

1. In a video unit such as SPS or PPS, add one or multiple syntax elements (e.g., sps_allowed_slice_idc) to specify whether the allowed slice types in a picture of a CLVS.

1) In one example, a first syntax element (e.g., sps_allowed_slice_idc) is added, and its semantics may be defined as: sps_allowed_slice_idc equal to X specifies that a picture only allows the following allowed slice types or any combination of them:

i. {all I}, {all P}, {all B}, {I, P}, {I, B}, {P, B}, {I, B, P} ii. In one example, the first syntax element may be coded with fixed length (e.g. u(1), u(2) or U(3)), unary coded, truncated unary coded, EG coded.

iii. Alternatively, furthermore, signalling and/or semantics and/or inference of one or multiple syntax elements signalled in SPS or PPS may be modified such that they are signalled only when the first syntax element satisfies certain conditions.

a. In one example, the one or multiple syntax elements are those for enabling a coding tool which requires more than one prediction signal, such as bi-prediction or mixed intra and inter coding, or prediction with linear/non-linear weighting from multiple prediction blocks.

b. In one example, the one or multiple syntax elements may include, but not limited to:

a) sps_weighted_bipred_flag
      b) sps_bdof_enabled_flag
      c) sps_smvd_enabled_flag
      d) sps_dmvr_enabled_flag
      e) sps_bcw_enabled_flag
      f) sps_ciip_enabled_flag
      g) sps_gpm_enabled_flag c. In one example, only when the first syntax element specifies that the CLVS associated with the video unit may contain one or more B slices, the one or multiple syntax elements may be signalled. Otherwise, the signalling is skipped, and the values of the syntax element are inferred.

d. In one example, when sps_b_slice_allowed_flag is equal to 0, the syntax elements sps_weighted_bi-pred_flag, sps_bdof_enabled_flag, sps_smvd_en-abled_flag, sps_dmvr_enabled_flag, sps_bcw_en-abled_flag, sps_ciip_enabled_flag, and sps_gpm_enabled_flag are not signalled and their values are inferred.

a) In one example, they are all inferred to be 0 when not present.

iv. Alternatively, furthermore, a second syntax element may be signalled in the General constraint informa-tion syntax, such as no_b_slice_contraint_flag, to indicate whether the first syntax element shall be equal to 0.

a. In one example, the semantics of the no_b_slice_contraint_flag is defined as follows:

no_b_slice_contraint_flag equal to 1 specifies that sps_allowed_slice_idc shall be equal to X (e.g., representing the allowed slice types to be {I, B, P} or {B, P}, {all B}).

no_b_slice_constraint_flag equal to 0 does not impose such a constraint.

v. Alternatively, furthermore, it is required that one or multiple syntax elements signalled in the General constraint information syntax shall be equal to 1 if the first syntax element specifies that the CLVS doesn't contain B slices (e.g., only sps_allowed_sli-ce_idc equal to X which represents {I, P}, {all I}, {all P}).

a. In one example, the one or multiple syntax ele-ments may include, but are not limited to:

a) no_bcw_constraint_flag b) no_ciip_constraint_flag c) no_gpm_constraint_flag d) no_bdof_constraint_flag e) no_dmvr_constraint_flag vi. Alternatively, furthermore, signalling and semantics of one or multiple syntax elements signalled in dpb_parameters ( ) may be modified such that they are signalled only when the first syntax element satisfies certain conditions.

a. In one example, the one or multiple syntax ele-ments may include, but not limited to:

a) max_num_reorder_pics b. In one example, when the first syntax element tells no B slice is allowed, the max_num_reorder_pics is not signalled and inferred to be 0.

In PH/SH

2. In the PH/SH, a variable X is used to indicate whether B slice is allowed/used in a picture/slice, and the variable may be derived from the SPS syntax element, and/or a new PH syntax element (e.g., ph_allowed_slice_idc) to specify the allowed slice types, and/or other syntax elements (e.g., the BSliceAllowed used in JVET-R0052).

1) In one example, the new PH syntax element is added and how to signal this syntax element may depend on the allowed slice types in SPS.

2) Alternatively, furthermore, signalling and/or semantics and/or inference of one or multiple syntax elements signalled in PH may be modified according to the variable.

i. In one example, the one or multiple syntax elements are those for enabling a coding tool which requires more than one prediction signal, such as bi-predic-tion or mixed intra and inter coding, or prediction with linear/non-linear weighting from multiple pre-diction blocks.

ii. In one example, the one or multiple syntax elements may include, but not limited to:

a) ph_collocated_from_10_flag b) mvd_11_zero_flag c) ph_disable_bdof_flag d) ph_disable_dmvr_flag e) num_11_weights iii. In one example, only when the first syntax element specifies that the picture may contain one or more B slices, the one or multiple syntax elements may be signalled. Otherwise, the signalling is skipped, and the values of the syntax element are inferred.

a) Alternatively, furthermore, whether to signal the one or more syntax elements may depend on the first syntax elements in bullet 1.1) and 2.1), such as (X being true or 1).

b) ph_disable_bdof_flag may be signalled only when (sps_bdof_pic_present_flag && X ) is true.

c) ph_disable_dmvr_flag may be signalled only when (sps_dmvr_pic_present_flag && X ) is true.

iv. In one example, when X is equal to 0 (or false), mvd_11_zero_flag is not signalled, and its values is inferred to be 1.

v. In one example, the inference of the one or multiple syntax elements are dependent on the value of the first syntax element.

a) In one example, for the ph_disable_bdof_flag, the following applies:

If sps_bdof_enabled_flag is equal to 1 and X is equal to 1 (or true), the value of ph_disable_bdof_flag is inferred to be equal to 0.

Otherwise (sps_bdof_enabled_flag is equal to 0 or X is equal to 0 (or false)), the value of ph_disable_bdof_flag is inferred to be equal to 1.

b) In one example, for the ph_disable_dmvr_flag, the following applies:

If sps_dmvr_enabled_flag is equal to 1 and X is equal to 1 (or true), the value of ph_disable_dmvr_flag is inferred to be equal to 0.

Otherwise (sps_dmvr_enabled_flag is equal to 0 or X is equal to 0 (or false)), the value of ph_disable_dmvr_flag is inferred to be equal to 1.

c) In one example, when ph_temporal_mvp_en-abled_flag and rpl_info_in_ph_flag are both equal to 1 and X is equal to 0 (or false), the value of ph_collocated_from_10_flag is inferred to be equal to 1.

d) In one example, when X is equal to 0 (or false), num_11_weights is not signalled and its value is inferred to be 0, and, consequently, weighted prediction parameters for reference picture list 1 are not signalled in the PH or SHs of the picture.

Inference of Syntax Elements

3. For syntax elements which are related to a coding tool X and/or a group of syntax elements which could be present in either A (e.g., a PH) or B (e.g., a SH) but not both, if the A is included in the B, then at least one of indication of presence of those syntax elements may be not signalled, and may be inferred to be 0, i.e., present in B.

1) In one example, the coding tool X may include one of the followings:

i. In-loop filtering technologies, e.g., deblocking filter, ALF, SAO ii. Weighted Prediction iii. QP delta information iv. RPL information 2) In one example, the condition 'the A is included in the B' may be defined as 'slice headers referring to the PPS contain the PH syntax structure', or 'current picture only consists of one slice'.

3) In one example, the 'indication of presence of those syntax elements' may be defined as one or multiple of the following syntax elements:

i. qp_delta_info_in_ph_flag, rpl_info_in_ph_flag, dbf_info_in_ph_flag, sao_info_in_ph_flag, wp_info_in_ph_flag, alf_info_in_ph_flag 4) In one example, one or multiple of the following changes are proposed. rpl_info_in_ph_flag equal to 1 specifies that reference picture list information is present in the PH syntax structure and not present in slice headers referring to the PPS that do not contain a PH syntax structure. rpl_info_in_ph_flag equal to 0 specifies that reference picture list information is not present in the PH syntax structure and may be present in slice headers referring to the PPS that do not contain a PH syntax structure. *When slice headers referring to the PPS contain the PH syntax structure, it is a requirement of bitstream conformance that rpl_info_in_ph_flag shall be equal to 0.* dbf_info_in_ph_flag equal to 1 specifies that deblocking filter information is present in the PH syntax structure and not present in slice headers referring to the PPS that do not contain a PH syntax structure. dbf_info_in_ph_flag equal to 0 specifies that deblocking filter information is not present in the PH syntax structure and may be present in slice headers referring to the PPS that do not contain a PH syntax structure. When not present, the value of dbf_info_in_ph_flag is inferred to be equal to 0. *When slice headers referring to the PPS contain the PH syntax structure, it is a requirement of bitstream conformance that dbf_info_in_ph_flag shall be equal to 0.* sao_info_in_ph_flag equal to 1 specifies that SAO filter information is present in the PH syntax structure and not present in slice headers referring to the PPS that do not contain a PH syntax structure. sao_info_in_ph_flag equal to 0 specifies that SAO filter information is not present in the PH syntax structure and may be present in slice headers referring to the PPS that do not contain a PH syntax structure. *When slice headers referring to the PPS contain the PH syntax structure, it is a requirement of bitstream conformance that sao_info_in_ph_flag shall be equal to 0.* alf_info_in_ph_flag equal to 1 specifies that ALF information is present in the PH syntax structure and not present in slice headers referring to the PPS that do not contain a PH syntax structure. alf_info_in_ph_flag equal to 0 specifies that ALF information is not present in the PH syntax structure and may be present in slice headers referring to the PPS that do not contain a PH syntax structure. *When slice headers referring to the PPS contain the PH syntax structure, it is a requirement of bitstream conformance that alf_info_in_ph_flag shall be equal to 0.* wp_info_in_ph_flag equal to 1 specifies that weighted prediction information may be present in the PH syntax structure and not present in slice headers referring to the PPS that do not contain a PH syntax structure. wp_info_in_ph_flag equal to 0 specifies that weighted prediction information is not present in the PH syntax structure and may be present in slice headers referring to the PPS that do not contain a PH syntax structure. When not present, the value of wp_info_in_ph_flag is inferred to be equal to 0. *When slice headers referring to the PPS contain the PH syntax structure, it is a requirement of bitstream conformance that wp_info_in_ph_flag shall be equal to 0.* qp_delta_info_in_ph_flag equal to 1 specifies that QP delta information is present in the PH syntax structure and not present in slice headers referring to the PPS that do not contain a PH syntax structure. qp_delta_info_in_ph_flag equal to 0 specifies that QP delta information is not present in the PH syntax structure and may be present in slice headers referring to the PPS that do not contain a PH syntax structure. *When slice headers referring to the PPS contain the PH syntax structure, it is a requirement of bitstream conformance that qp_delta_info_in_ph_flag shall be equal to 0.*

4. A conformance bitstream shall follow the rule that it is require the setting of NoOutputOfPriorPicsFlag to be equal to 1 for the splicing-point picture that is a CLVS AU in the spliced bitstream when its POC value is greater than the POC value of the previous picture.

5. Whether to signal a syntax element which indicates inter slices/B slices/P slices is allowed in a picture and/or RPL/WP information, and/or indication of presence of RPL/WP information may be dependent on the picture type and layer independency is enabled or not.

1) In one example, the syntax element is not signalled for IRAP pictures and layer independency is enabled.

i. In one example, ph_inter_slice_allowed_flag in VVC is not signalled for IRAP pictures and layer independency is enabled.

ii. In one example, slice_type in VVC is not signalled for IRAP pictures and layer independency is enabled.

iii. In one example, ph_slice_type in JVET-R0052 is not signalled for IRAP pictures and layer independency is enabled.

2) In one example, the syntax element is not signalled for IRAP pictures and layer independency is enabled, even the presence of such information tells they are in PH.

i. When gdr_or_irap_pic_flag is equal to 1 and gdr_pic_flag is equal to 0, a new flag called idr_pic_flag is proposed to specify whether the picture associated with the picture header is an IDR picture. And the following may be applied:

a. When sps_idr_rpl_present_flag is equal to 0, layer independency is enabled, and idr_pic_flag is equal to 1, RPL signalling is not present in the PH, even when the value of rpl_info_in_ph_flag is equal to 1.

b. When sps_idr_rpl_present_flag is equal to 0, layer independency is enabled, and idr_pic_flag is equal to 1, WP signalling is not present in the PH, even when the value of wp_info_in_ph_flag is equal to 1.

6. It is proposed that when sps_video_parameter_set_id is greater than 0 and there is an OLS that contains only one layer with nuh_layer_id equal to the nuh_layer_id of the SPS, or sps_video_parameter_set_id is equal to 0, the value of sps_ptl_dpb_hrd_params_present_flag shall be equal to 1.

Reference List Related

7. The signaling and/or generating of reference picture list may depend on the allowed slice types in a picture of a CLVS.

1) For example, one or multiple syntax elememnts to build reference list 1 may not be signaled if B-slices are not allowed in a CLVS.

2) For example, one or multiple procedures to build reference list 1 may not be conducted if B-slices are not allowed in a CLVS.

APS Related

8. It is required that two APSs shall not have the same APS_id in a sequence, in a CLVS or in a bit-stream.

1) Alternatively, it is required that two APSs with the same APS type (such as ALF APS or LMCS APS) shall not have the same APS_id in a sequence, in a CLVS or in a bit-stream.

2) Alternatively, it is allowed that two APSs with the same APS type (such as ALF APS or LMCS APS) have the same APS_id, but they must have the same contents in a sequence, in a CLVS or in a bit-stream.

3) Alternatively, it is allowed that two APSs with the same APS type (such as ALF APS or LMCS APS) have the same APS_id. And the APS signaled earlier is replaced by the APS signaled latter.

4) Alternatively, it is allowed that two APSs with the same APS type (such as ALF APS or LMCS APS) have the same APS_id. And the APS signaled latter is ignored.

9. Two different parameter sets (e.g., APS and SPS)may be dependent on each other, and the syntax element or a variable derived according to syntax element in a first parameter set could be used for conditionally signalling another syntax element in a second parameter set.

1) Alternatively, and the syntax element or a variable derived according to syntax element in a first parameter set could be used derive value of another syntax element in a second parameter set.

Noncoded Subpicture Related

10. It is proposed that a boundary of a noncoded subpicture must be treated as a picture boundary.

11. It is proposed that loop filtering (such as ALF/deblocking/SAO) cannot cross a boundary of a noncoded subpicture.

12. It is required that if there is only one subpicture, it cannot be a noncoded subpicture.

13. It is required that a noncoded subpicture cannot be extracted.

14. It is proposed that the information related to noncoded subpicture(s) may be signaled in a SEI message.

15. It is required that a noncoded subpicture can only have one slice.

16. It is required that the top-left subpicture cannot be a noncoded subpicture.

17. It is required that at least one of the subpictures is not noncoded subpictures.

18. Whether and/how to code side information related subpictures may be dependent on whether a subpicture is noncoded subpicture.

1) In one example, if it is noncoded subpicture, no need to signal the side information.

19. Alternatively, furthermore, for above requirements, they may be revised as conditionally signalling according to above cases.

A listing of examples preferred by some embodiments is provided next.

The first set of clauses show example embodiments of techniques discussed in the previous section. The following clauses show example embodiments of techniques discussed in the previous section (e.g., item 1).

Figure 3:
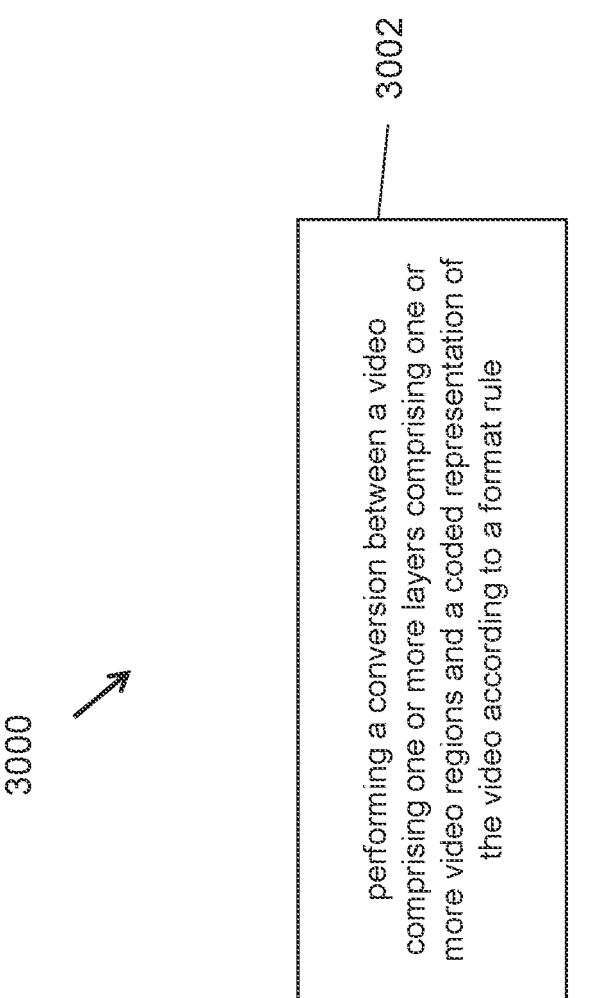
FIG. 3 is a flowchart for an example method of video processing.
Figure 4:
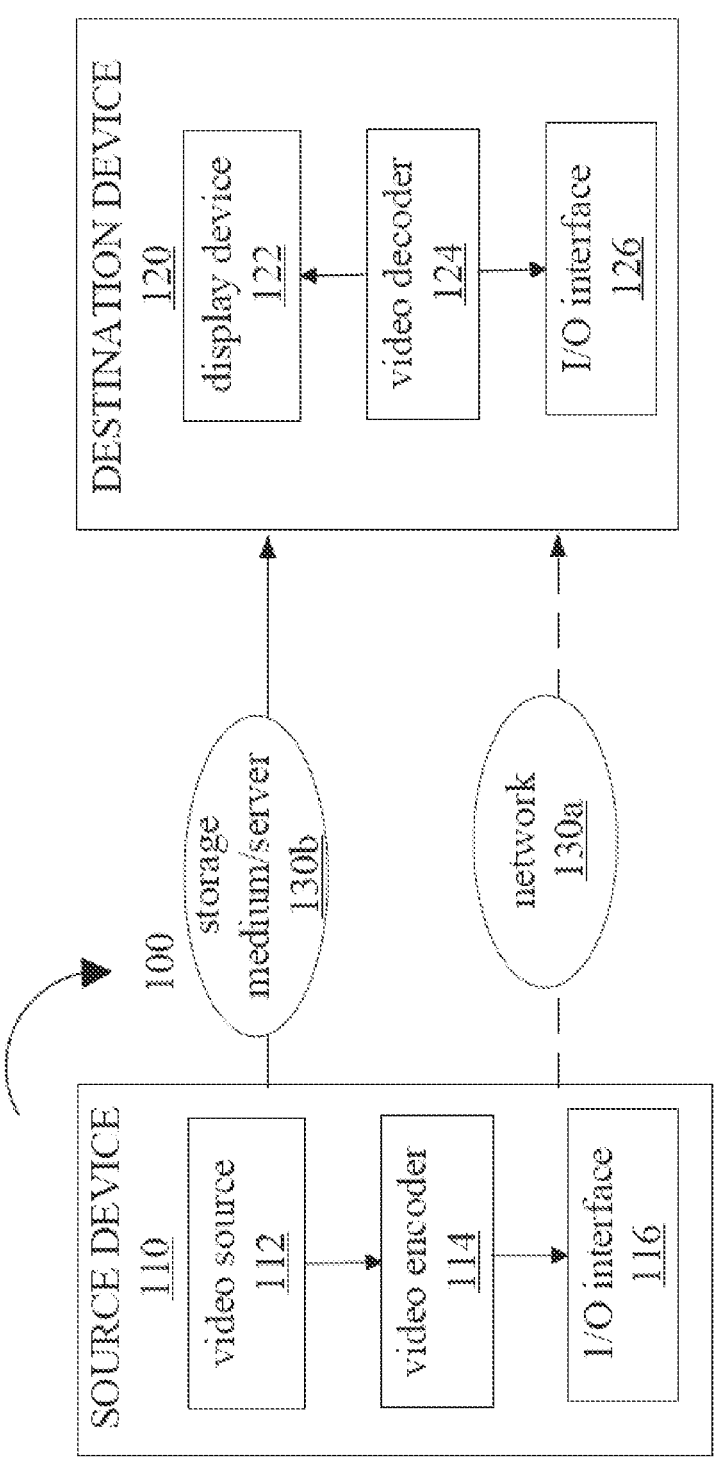
FIG. 4 is a block diagram that illustrates a video coding system in accordance with some embodiments of the present disclosure.
Figure 5:
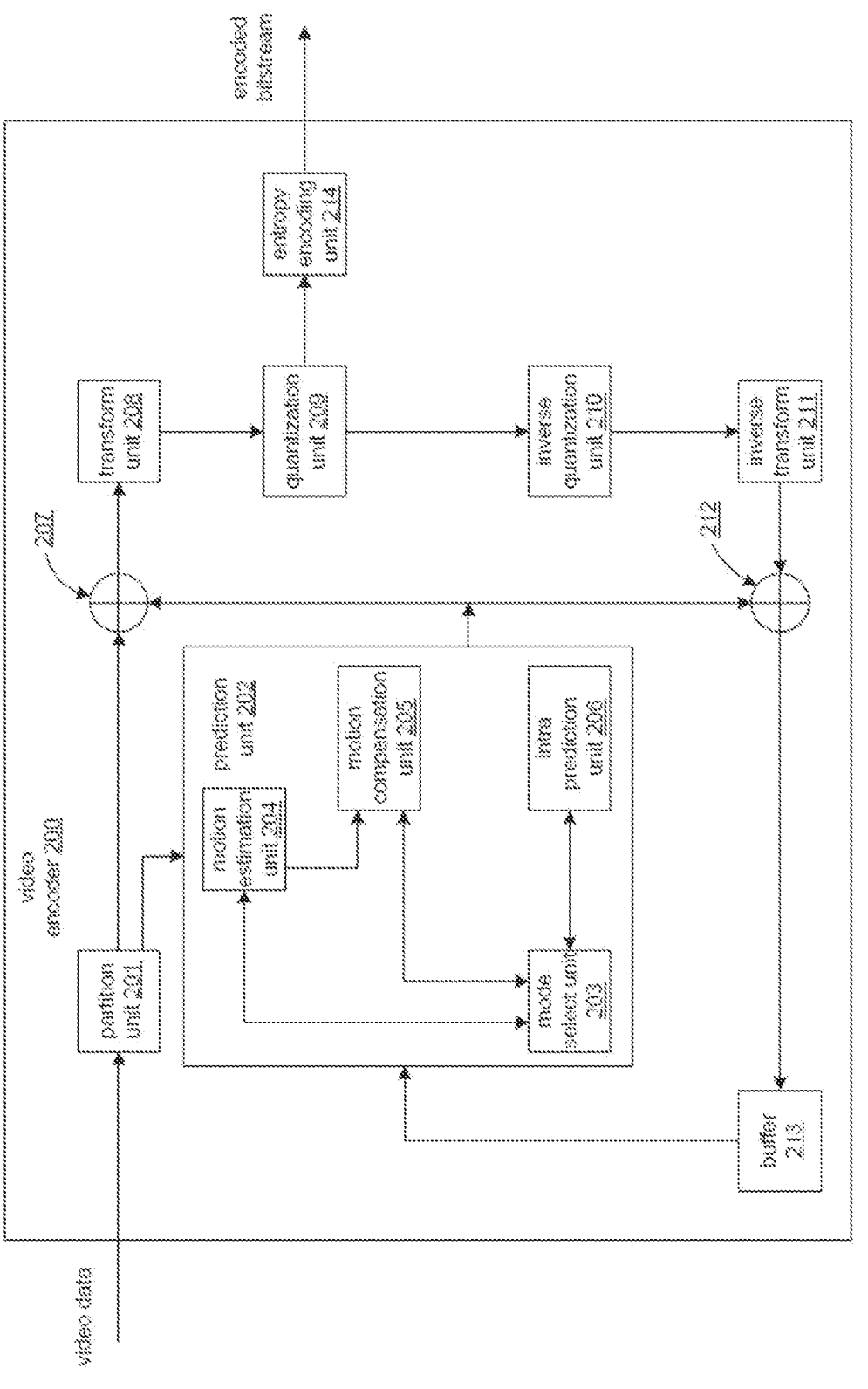
FIG. 5 is a block diagram that illustrates an encoder in accordance with some embodiments of the present disclosure.
Figure 6:
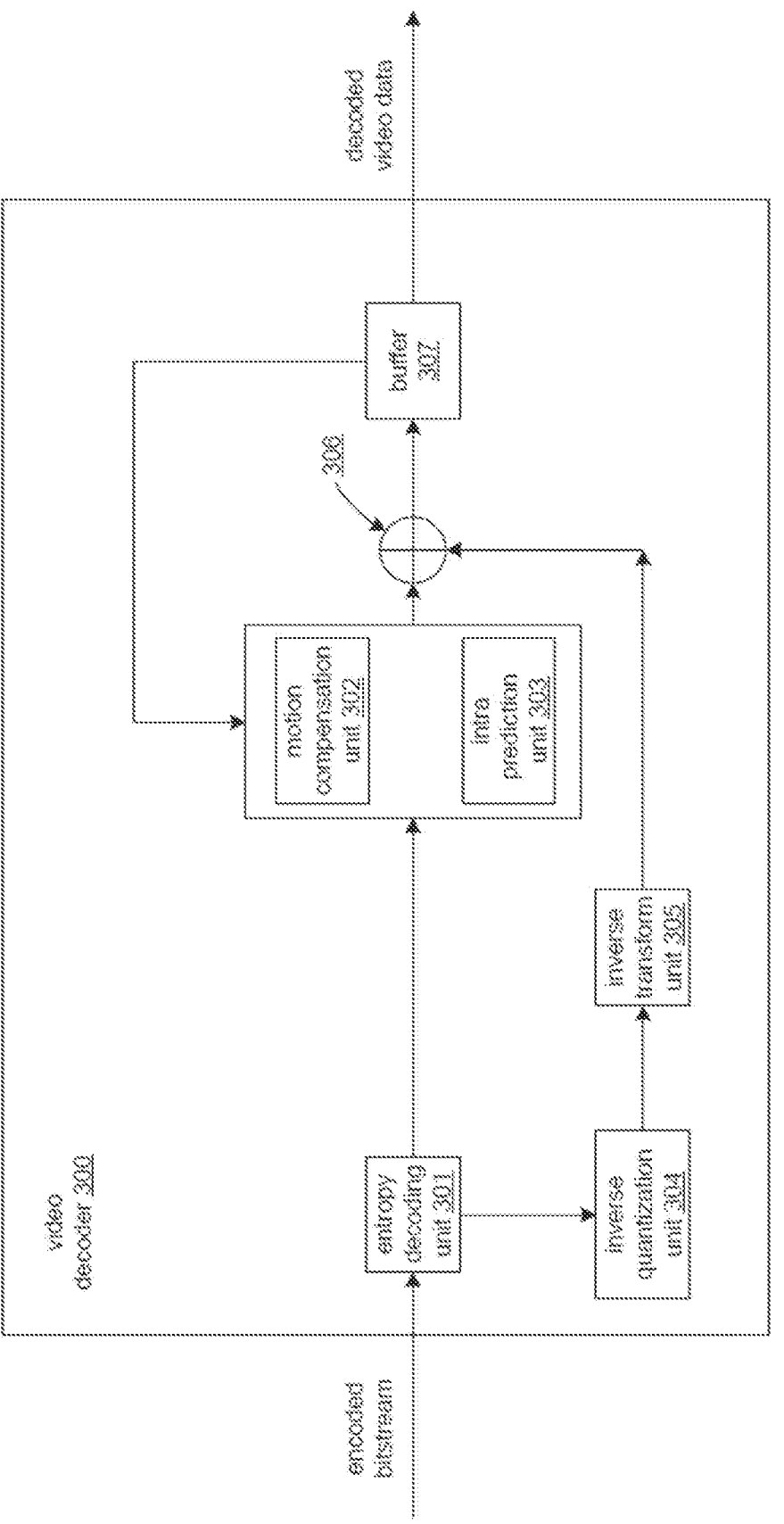
FIG. 6 is a block diagram that illustrates a decoder in accordance with some embodiments of the present disclosure.

1. A video processing method (e.g., method 3000 shown in FIG. 3), comprising performing (3002) a conversion between a video comprising one or more layers comprising one or more video regions and a coded representation of the video according to a format rule, wherein the format rule specifies that one or more syntax elements are included in the coded representation at the one or more video region level corresponding to allowed slice types for a corresponding video region.

2. The method of clause 1, wherein the format rule specifies that the one or more syntax elements include a first syntax element whose value is indicative of slice type combinations allowed in the corresponding video region.

The following clauses show example embodiments of techniques discussed in the previous section (e.g., item 2).

3. The method of any of clauses 1-2, wherein the format rule specifies that a syntax element is included in a picture header or a slice header to indicate whether bidirectionally predicted (B) slices are allowed or used for a corresponding picture or a slice.

4. The method of clause 3, wherein a syntax element in a sequence parameter set controls presence of the syntax element included in the picture header or the slice header.

The following clauses show example embodiments of techniques discussed in the previous section (e.g., item 3).

5. A video processing method, comprising: performing a conversion between a video comprising one or more layers comprising one or more video pictures comprising one or more video slices and a coded representation of the video according to a format rule, wherein the format rule specifies that syntax elements related to enablement or use of a coding mode at a slice level are included at most once between either a picture header or a slice header according to a second rule.

6. The method of clause 5, wherein the coding mode includes an in-loop filter or a weighted prediction mode or a quantization parameter delta mode.

The following clauses show example embodiments of techniques discussed in the previous section (e.g., item 7).

7. A video processing method, comprising: performing a conversion between a video comprising one or more video pictures comprising one or more video slices and a coded representation of the video according to a format rule, wherein the format rule specifies that allowed slice types in a video picture controls whether a reference picture list is signaled in or generatable from the coded representation.

8. The method of clause 7, wherein the format rule specifies that due to the allowed slice types excluding bidirectional slices (B-slices), syntax elements corresponding to a reference picture list 1 are omitted from the coded representation.

9. The method of clause 7, wherein the format rule specifies that due to the allowed slice types excluding bidirectional slices (B-slices), a procedure for generation of a reference picture list 1 is disabled for a video picture.

The following clauses show example embodiments of techniques discussed in the previous section (e.g., items 10-15).

10. A video processing method, comprising: performing a conversion between a video comprising one or more video pictures comprising one or more subpictures wherein the coded representation conforms to a format rule, wherein the format rule specifies a processing of a noncoded subpicture of a video picture.

11. The method of clause 10, wherein the format rule specifies that a boundary of the noncoded subpicture is processed as a picture boundary during the conversion.

12. The method of clause 10, wherein the format rule specifies to disable a loop filtering across a boundary of the noncoded picture.

13. The method of clause 10, wherein the format rule disallows the noncoded subpicture to be only subpicture of the video picture.

14. The method of any of clauses 10-13, wherein the format rule specifies that information for decoding assistance of the noncoded subpicture is includes in a supplementary enhancement information syntax element of the coded representation.

15. The method of clause 10, wherein the format rule specifies that the noncoded subpicture is allowed to have at most one slice.

16. The method of any of above clauses, wherein the video region comprises a video picture or a video slice.

17. The method of any of clauses 1 to 16, wherein the conversion comprises encoding the video into the coded representation.

18. The method of any of clauses 1 to 16, wherein the conversion comprises decoding the coded representation to generate pixel values of the video.

19. A video decoding apparatus comprising a processor configured to implement a method recited in one or more of clauses 1 to 18.

20. A video encoding apparatus comprising a processor configured to implement a method recited in one or more of clauses 1 to 18.

21. A computer program product having computer code stored thereon, the code, when executed by a processor, causes the processor to implement a method recited in any of clauses 1 to 18.

22. A method, apparatus or system described in the present document.

A second set of clauses show example embodiments of techniques discussed in the previous section (e.g., items 1-19).

1. A method of video processing (e.g., method 700 as shown in FIG. 7A), comprising: performing a conversion between a video comprising one or more pictures and a bitstream of the video according to a format rule, and wherein the format rule specifies that, in response to satisfying one or more conditions, a syntax element indicating whether a first syntax structure providing a profile, a tier and a level information and a second syntax structure providing decoded picture buffer information are present in a sequence parameter set is set to be equal to 1 to indicate that the first syntax structure and the second syntax structure are present in the sequence parameter set.

2. The method of clause 1, wherein the one or more conditions include 1) a video parameter set identifier referenced by the sequence parameter set is greater than 0 and there exists an output layer set that contains only one layer having a NAL (network abstraction layer) unit header layer identifier equal to a particular value, or 2) the video parameter set identifier is equal to 0.

3. The method of clause 1 or 2, wherein the syntax element equal to 1 further specifies that a third syntax structure providing general timing and hypothetical reference decoder parameters information and a forth syntax structure providing output layer set timing and hypothetical reference decoder parameters information are allowed to be present in the sequence parameter set.

4. The method of clause 3, wherein the third syntax structure corresponds to general_timing_hrd_parameters( ) syntax structure, and the forth syntax structure corresponds to ols_timing_hrd_parameters( ) syntax structure.

5. The method of any of clauses 1 to 4, wherein the syntax element corresponds to sps_ptl_dpb_hrd_params_present_flag, the first syntax structure corresponds to profile_tier_level( ) syntax structure, and the second syntax structure corresponds to dpb_parameters( ) syntax structure.

6. A method of video processing (e.g., method 710 as shown in FIG. 7B), comprising: performing a conversion between a video and a bitstream of the video including one or more coded layers according to a format rule, and wherein the format rule specifies that one or more syntax elements that indicate allowed slice types in a picture of a coded layer video sequence are included in one or more parameter sets and/or a general constraint information syntax structure.

7. The method of clause 6, wherein the format rule specifies to further include a first syntax element whose value is indicative of the allowed slice types or slice type combinations allowed in a video region.

8. The method of clause 7, wherein the format rule specifies that the one or more syntax elements are signaled only when the first syntax element satisfies certain conditions.

9. The method of clause 7, wherein the format rule specifies that general constrain information syntax structure includes a second syntax element to indicate whether the first syntax element is equal to 0.

10. The method of clause 7, wherein the format rule specifies that the one or more syntax elements is equal to 1 in case that the first syntax element specifies that no bidirectionally predicted (B) slice is included in the coded layer video sequence.

11. A method of video processing (e.g., method 720 as shown in FIG. 7C), comprising: performing 722 a conversion between a video comprising one or more layers comprising one or more pictures comprising one or more slices and a bitstream of the video according to a format rule, and wherein the format rule specifies that a syntax element is included in a picture header or a slice header to indicate whether bidirectionally predicted (B) slices are allowed or used for a corresponding picture or slice of the video.

12. The method of clause 11, wherein the format rule specifies that a syntax element in a sequence parameter set controls presence of the syntax element included in the picture header or the slice header.

13. The method of clause 11, wherein the format rule specifies that how to signal the syntax element in the picture header depends on allowed slice types in a sequence parameter set.

14. The method of clause 11, wherein the format rule specifies that the syntax element controls signaling and/or semantics and/or inference of one or more syntax elements included in the picture header.

15. A method of video processing (e.g., method 730 as shown in FIG. 7D), comprising: performing 732 a conversion between a video comprising one or more layers comprising one or more pictures comprising one or more slices and a bitstream of the video according to a format rule, and wherein the format rule specifies that one or more syntax elements related to enablement or use of a coding mode at a slice level are included at most once between either a picture header or a slice header according to a second rule.

16. The method of clause 15, wherein the coding mode includes an in-loop filtering or a weighted prediction mode or a quantization parameter delta mode or reference picture list information.

17. The method of clause 15, wherein the format rule specifies that the slice header referring to a picture parameter set contains a picture header syntax structure, it is a requirement of bitstream conformance that values of the one or more syntax elements are equal to 0.

Figure 7E:
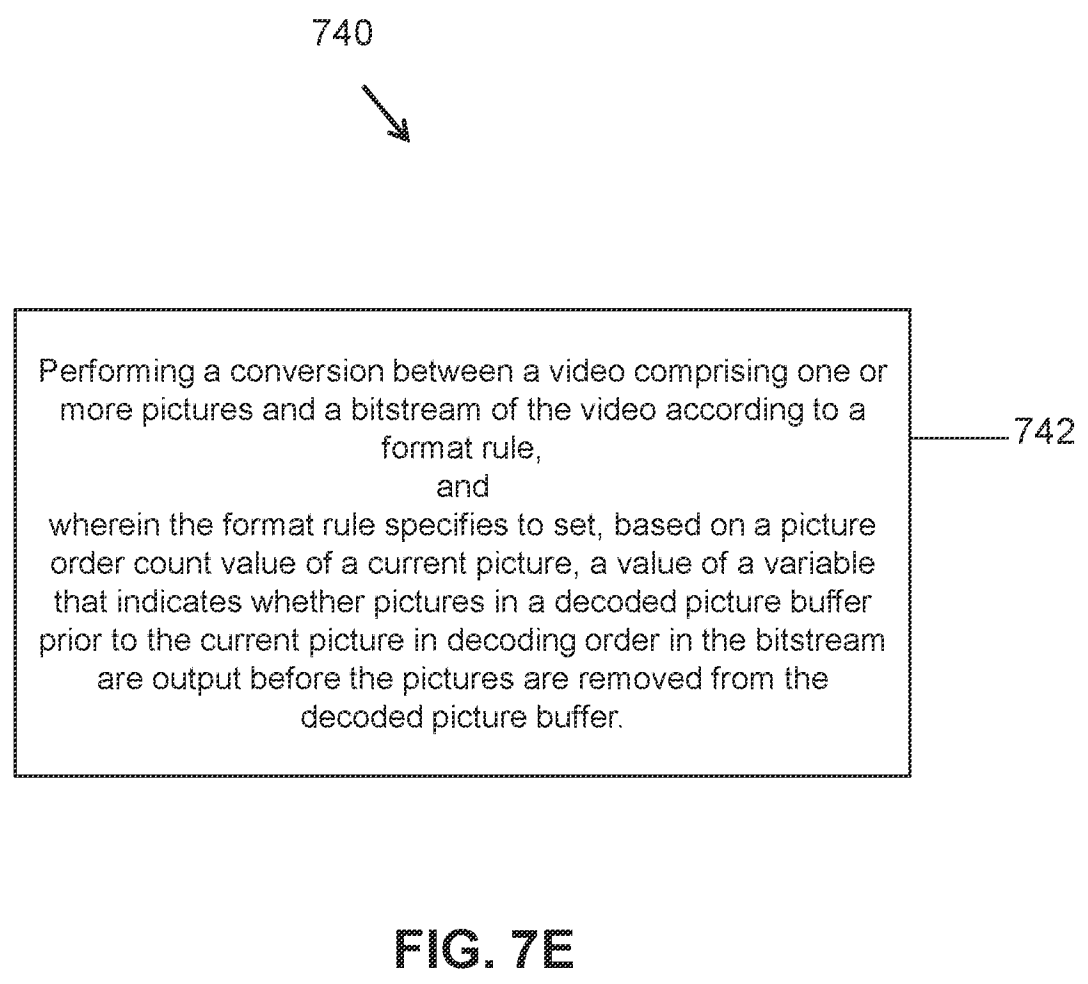

18. A method of video processing (e.g., method 740 as shown in FIG. 7E), comprising: performing 742 a conversion between a video comprising one or more pictures and a bitstream of the video according to a format rule, and wherein the format rule specifies to set, based on a picture order count value of a current picture, a value of a variable that indicates whether pictures in a decoded picture buffer prior to the current picture in decoding order in the bitstream are output before the pictures are removed from the decoded picture buffer.

19. The method of clause 18, wherein the format rule specifies to set the value of the variable to be equal to 1 for the current picture that is a splicing-point picture and a coded layer video sequence access unit in the bitstream, in case that the picture order count value of the current picture is greater than a picture order count value of a previous picture.

Figure 7F:
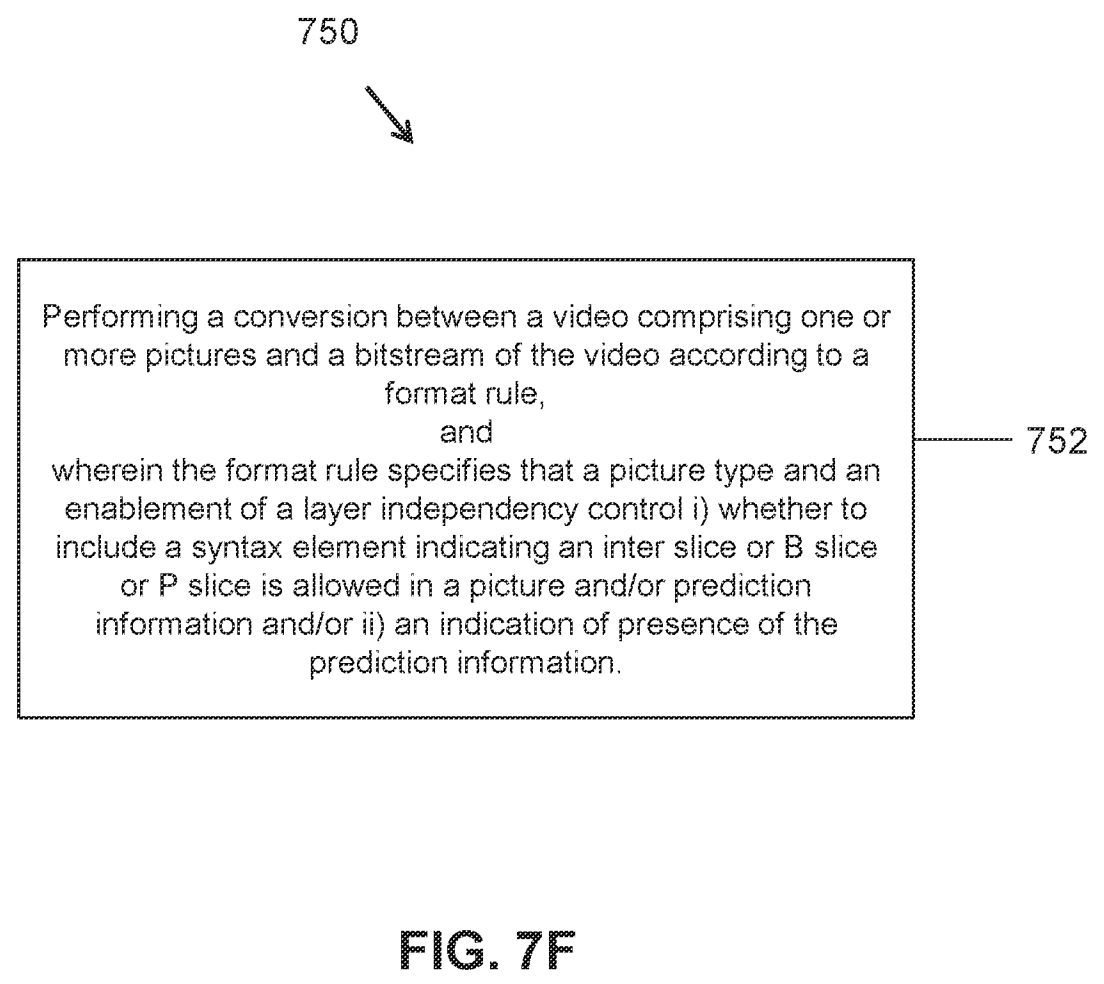

20. A method of video processing (e.g., method 750 as shown in FIG. 7F), comprising: performing a conversion between a video comprising one or more pictures and a bitstream of the video according to a format rule, and wherein the format rule specifies that a picture type and an enablement of a layer independency control i) whether to include a syntax element indicating an inter slice or B slice or P slice is allowed in a picture and/or prediction information and/or ii) an indication of presence of the prediction information.

21. The method of clause 20, wherein the format rule specifies that the syntax element is not included in case that i) the picture type is an intra random access point picture and ii) the layer independency is enabled.

22. The method of clause 21, wherein the format rule specifies that the syntax element is not included in case that i) and ii) are satisfied, regardless of another syntax element indicating a presence of the prediction information in a picture header.

23. The method of clause 21 or 22, wherein the format rule specifies to further include a variable specifying whether the picture associated with the picture header is an instantaneous decoding refresh (IDR) picture, in case that the picture is the intra random access point picture.

24. The method of any of clauses 21 to 23, wherein the format rule specifies that the indication of presence of the prediction information is not present in the picture header.

25. A method of video processing (e.g., method 760 as shown in FIG. 7G), comprising: performing 762 a conversion between a video comprising one or more pictures and a bitstream of the video according to a format rule, wherein the format rule specifies that use of a reference picture list during the conversion of a coded layer video sequence depends on allowed slice types in a picture corresponding to the coded layer video sequence of the video.

26. The method of clause 25, wherein the format rule specifies that due to the allowed slice types excluding bidirectional slices (B-slices), syntax elements corresponding to a reference picture list 1 are omitted from the bitstream.

27. The method of clause 25, wherein the format rule specifies that due to the allowed slice types excluding bidirectional slices (B-slices), a procedure for generation of a reference picture list 1 is disabled for a video picture.

Figure 7H:
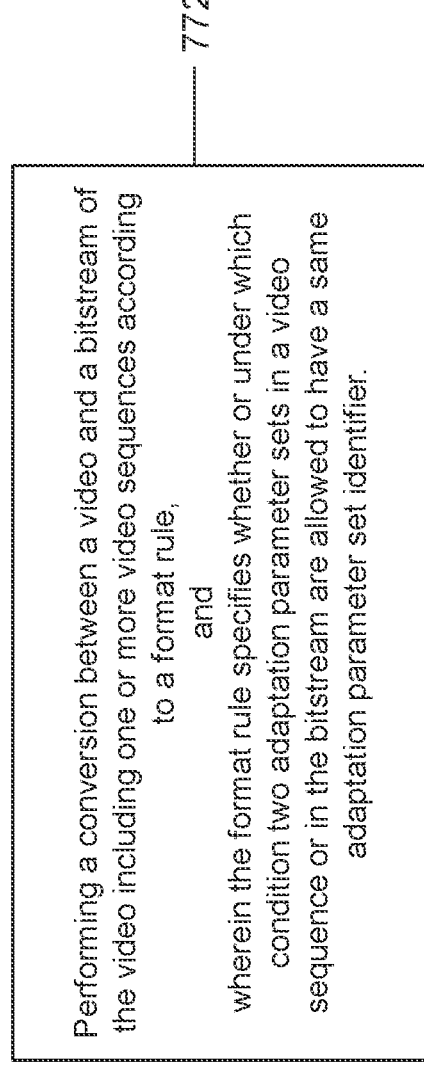
Figure 71:
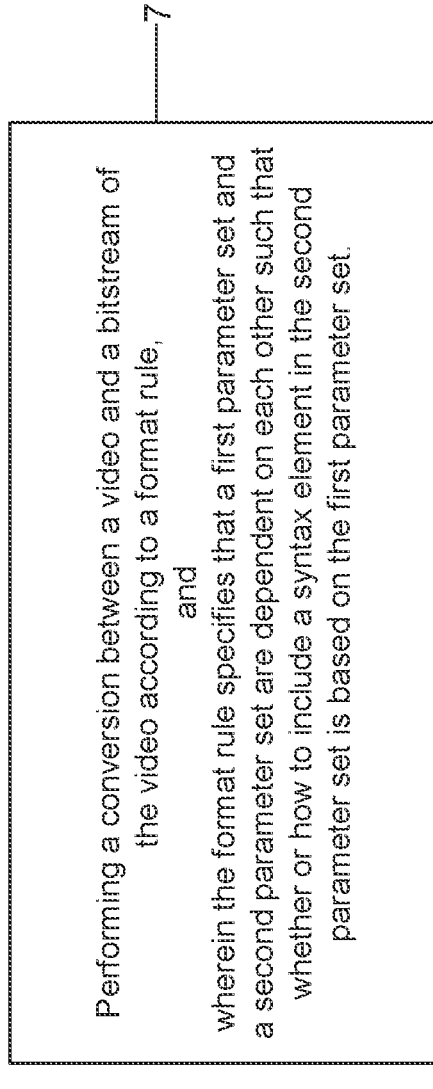

28. A method of video processing (e.g., method 770 as shown in FIG. 7H), comprising: performing 772 a conversion between a video and a bitstream of the video including one or more video sequences according to a format rule, and wherein the format rule specifies whether or under which condition two adaptation parameter sets in a video sequence or in the bitstream are allowed to have a same adaptation parameter set identifier.

29. The method of clause 28, wherein the format rule specifies that the two adaptation parameter sets do not have the same adaptation parameter set identifier.

30. The method of clause 28, wherein the two adaptation parameter sets do not have the same adaptation parameter set identifier in case that the two adaptation parameter sets have a same adaptation parameter set type.

31. The method of clause 28, wherein the two adaptation parameter sets have the same adaptation parameter set identifier in case that 1) the two adaptation parameter sets have a same adaptation parameter set type and have same contents or 2) the two adaptation parameter sets have a same adaptation parameter set type.

32. A method of video processing (e.g., method 780 as shown in FIG. 7I), comprising: performing 782 a conversion between a video and a bitstream of the video according to a format rule, and wherein the format rule specifies that a first parameter set and a second parameter set are dependent on each other such that whether or how to include a syntax element in the second parameter set is based on the first parameter set.

33. The method of clause 32, wherein the format rule specifies that the syntax element in the second parameter set is conditionally included or derived based on a syntax element or a variable that is derived according to another syntax element in the first parameter set.

Figure 7J:
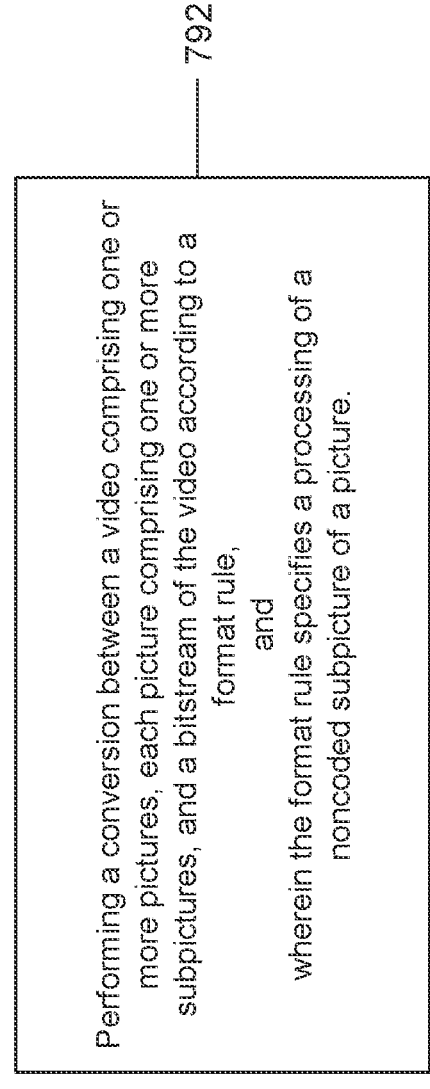

34. A method of video processing (e.g., method 790 as shown in FIG. 7J), comprising: performing 792 a conversion between a video comprising one or more pictures, each picture comprising one or more subpictures, and a bitstream of the video according to a format rule, wherein the format rule specifies a processing of a noncoded subpicture of a picture.

35. The method of clause 34, wherein the format rule specifies that a boundary of the noncoded subpicture is processed as a picture boundary during the conversion.

36. The method of clause 34, wherein the format rule specifies to disable a loop filtering across a boundary of the noncoded subpicture.

37. The method of clause 34, wherein the format rule disallows the noncoded subpicture to be only subpicture of the video picture.

38. The method of clause 34, wherein the format rule specifies not to extract the noncoded subpicture during the conversion.

39. The method of clause 34, wherein the format rule specifies that information for decoding assistance of the noncoded subpicture is included in a supplementary enhancement information syntax element of the bitstream.

40. The method of clause 34, wherein the format rule specifies that the noncoded subpicture is allowed to have at most one slice.

41. The method of clause 34, wherein the format rule specifies that the noncoded subpicture is not a top-left subpicture of the picture.

42. The method of clause 34, wherein the format rule specifies that at least one of the one or more subpictures is a coded subpicture.

43. The method of clause 34, wherein the format rule specifies whether and/or how to code side information related to the one or more subpictures is dependent on whether a subpicture is a coded or noncoded.

44. The method of any of clauses 1 to 43, wherein the conversion includes encoding the video into the bitstream.

45. The method of any of clauses 1 to 43, wherein the conversion includes decoding the video from the bitstream.

46. The method of clauses 1 to 43, wherein the conversion includes generating the bitstream from the video, and the method further comprises: storing the bitstream in a non-transitory computer-readable recording medium.

47. A video processing apparatus comprising a processor configured to implement a method recited in any one or more of clauses 1 to 46.

48. A method of storing a bitstream of a video, comprising, a method recited in any one of clauses 1 to 46, and further including storing the bitstream to a non-transitory computer-readable recording medium.

49. A computer readable medium storing program code that, when executed, causes a processor to implement a method recited in any one or more of clauses 1 to 46.

50. A computer readable medium that stores a bitstream generated according to any of the above described methods.

51. A video processing apparatus for storing a bitstream representation, wherein the video processing apparatus is configured to implement a method recited in any one or more of clauses 1 to 46.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of video processing, comprising:
performing a conversion between a video comprising one or more pictures and a bitstream of the video according to a format rule, and
wherein the format rule specifies that, in response to satisfying one or more conditions, a syntax element indicating whether a first syntax structure providing level information and a second syntax structure providing decoded picture buffer information are present in a sequence parameter set is set to be equal to 1 to indicate that the first syntax structure and the second syntax structure are present in the sequence parameter set,
wherein the one or more conditions are related with a video parameter set identifier referenced by the sequence parameter set.

2. The method of claim 1, wherein the one or more conditions are further related with whether there exists an output layer set that contains only one layer having a NAL (network abstraction layer) unit header layer identifier equal to a particular value.

3. The method of claim 1, wherein the one or more conditions include 1) the video parameter set identifier referenced by the sequence parameter set is greater than 0 and there exists an output layer set that contains only one layer having a NAL (network abstraction layer) unit header layer identifier equal to a particular value, or 2) the video parameter set identifier is equal to 0.

4. The method of claim 1, wherein the syntax element corresponds to sps_ptl_dpb_hrd_params_present_flag, the first syntax structure corresponds to profile_tier_level ( ) syntax structure, and the second syntax structure corresponds to dpb_parameters ( ) syntax structure.

5. The method of claim 1, wherein the conversion includes encoding the video into the bitstream.

6. The method of claim 1, wherein the conversion includes decoding the video from the bitstream.

7. An apparatus for processing video data comprising a processor and a non-transitory memory with instructions thereon, wherein the instructions upon execution by the processor, cause the processor to:
perform a conversion between a video comprising one or more pictures and a bitstream of the video according to a format rule, and
wherein the format rule specifies that, in response to satisfying one or more conditions, a syntax element indicating whether a first syntax structure providing level information and a second syntax structure providing decoded picture buffer information are present in a sequence parameter set is set to be equal to 1 to indicate that the first syntax structure and the second syntax structure are present in the sequence parameter set,
wherein the one or more conditions are related with a video parameter set identifier referenced by the sequence parameter set.

8. The apparatus of claim 7, wherein the one or more conditions are further related with whether there exists an output layer set that contains only one layer having a NAL (network abstraction layer) unit header layer identifier equal to a particular value.

9. The apparatus of claim 7, wherein the one or more conditions include 1) the video parameter set identifier referenced by the sequence parameter set is greater than 0 and there exists an output layer set that contains only one layer having a NAL (network abstraction layer) unit header layer identifier equal to a particular value, or 2) the video parameter set identifier is equal to 0.

10. The apparatus of claim 7, wherein the syntax element corresponds to sps_ptl_dpb_hrd_params_present_flag, the first syntax structure corresponds to profile_tier_level ( ) syntax structure, and the second syntax structure corresponds to dpb_parameters ( ) syntax structure.

11. A non-transitory computer-readable storage medium storing instructions that cause a processor to:
perform a conversion between a video comprising one or more pictures and a bitstream of the video according to a format rule, and
wherein the format rule specifies that, in response to satisfying one or more conditions, a syntax element indicating whether a first syntax structure providing level information and a second syntax structure providing decoded picture buffer information are present in a sequence parameter set is set to be equal to 1 to indicate that the first syntax structure and the second syntax structure are present in the sequence parameter set,
wherein the one or more conditions are related with a video parameter set identifier referenced by the sequence parameter set.

12. The medium of claim 11, wherein the one or more conditions include 1) the video parameter set identifier referenced by the sequence parameter set is greater than 0 and there exists an output layer set that contains only one layer having a NAL (network abstraction layer) unit header layer identifier equal to a particular value, or 2) the video parameter set identifier is equal to 0.

13. The medium of claim 11, wherein the syntax element corresponds to sps_ptl_dpb_hrd_params_present_flag, the first syntax structure corresponds to profile_tier_level ( ) syntax structure, and the second syntax structure corresponds to dpb_parameters ( ) syntax structure.

14. A non-transitory computer-readable recording medium storing a bitstream of a video which is generated by a method performed by a video processing apparatus, wherein the method comprises:
generating the bitstream of the video comprising one or more pictures and a bitstream of the video according to a format rule, and
wherein the format rule specifies that, in response to satisfying one or more conditions, a syntax element indicating whether a first syntax structure providing level information and a second syntax structure providing decoded picture buffer information are present in a sequence parameter set is set to be equal to 1 to indicate that the first syntax structure and the second syntax structure are present in the sequence parameter set, wherein the one or more conditions are related with a video parameter set identifier referenced by the sequence parameter set.

15. The medium of claim 14, wherein the one or more conditions include 1) the video parameter set identifier referenced by the sequence parameter set is greater than 0 and there exists an output layer set that contains only one layer having a NAL (network abstraction layer) unit header layer identifier equal to a particular value, or 2) the video parameter set identifier is equal to 0.

16. The medium of claim 14, wherein the syntax element corresponds to sps_ptl_dpb_hrd_params_present_flag, the first syntax structure corresponds to profile_tier_level ( ) syntax structure, and the second syntax structure corresponds to dpb_parameters ( ) syntax structure.

* * * * *